United States Patent [19]
Diller et al.

[11] Patent Number: 5,487,002
[45] Date of Patent: Jan. 23, 1996

[54] ENERGY MANAGEMENT SYSTEM FOR VEHICLES HAVING LIMITED ENERGY STORAGE

[75] Inventors: Robert W. Diller; Jeffrey W. Pavlat, both of Pasadena, Calif.

[73] Assignee: Amerigon, Inc., Monrovia, Calif.

[21] Appl. No.: 999,491

[22] Filed: Dec. 31, 1992

[51] Int. Cl.$^6$ .................................................. B60K 6/04
[52] U.S. Cl. ...................... 364/424.01; 364/492; 320/43; 320/49
[58] Field of Search ......................... 364/424.01, 431.01, 364/431.11, 492; 73/116, 117.2; 320/27, 28, 43, 48, 49; 324/427, 434, 522

[56] References Cited

U.S. PATENT DOCUMENTS

| | | | |
|---|---|---|---|
| 4,223,532 | 9/1980 | Shiber | 60/414 |
| 4,258,421 | 3/1981 | Juhasz et al. | 364/424 |
| 4,303,850 | 12/1981 | Juhasz et al. | 235/92 T |
| 4,390,841 | 6/1983 | Martin et al. | 324/427 |
| 4,536,697 | 8/1985 | Johnston et al. | 322/14 |
| 4,709,202 | 11/1987 | Koenck et al. | 320/43 |
| 4,843,575 | 6/1989 | Crane | 364/550 |
| 4,945,870 | 8/1990 | Richeson | 123/90.11 |
| 4,964,058 | 10/1990 | Brown, Jr. | 364/492 |
| 4,990,885 | 2/1991 | Irick et al. | 340/455 |
| 5,012,421 | 4/1991 | Ishii | 364/431.1 |
| 5,091,856 | 2/1992 | Hasegawa et al. | 364/424.05 |
| 5,099,348 | 3/1992 | Huddleston et al. | 340/825.54 |
| 5,150,045 | 9/1992 | Nagano et al. | 320/6 |
| 5,157,319 | 10/1992 | Klontz et al. | 320/2 |
| 5,257,190 | 10/1993 | Crane | 364/424.03 |
| 5,284,116 | 2/1994 | Richeson, Jr. | 364/424.01 |
| 5,318,142 | 6/1994 | Bates et al. | 364/424.01 |
| 5,426,589 | 6/1995 | Kitagawa et al. | 364/483 |

*Primary Examiner*—Michael Zanelli
*Assistant Examiner*—Tan Nguyen
*Attorney, Agent, or Firm*—Christie, Parker & Hale

[57] ABSTRACT

The energy management control system employs sensors for monitoring of energy consumption by various vehicle systems and provides energy consumption prediction for range calculation based on standard or memorized driving data. A navigation system in cooperation with the energy management system allows route planning based on energy consumption considerations and provides alternative routes for energy deficient conditions. A controller in the system with an associated display provides information to a vehicle driver concerning system status and controls various vehicle systems for increased energy efficiency.

12 Claims, 18 Drawing Sheets

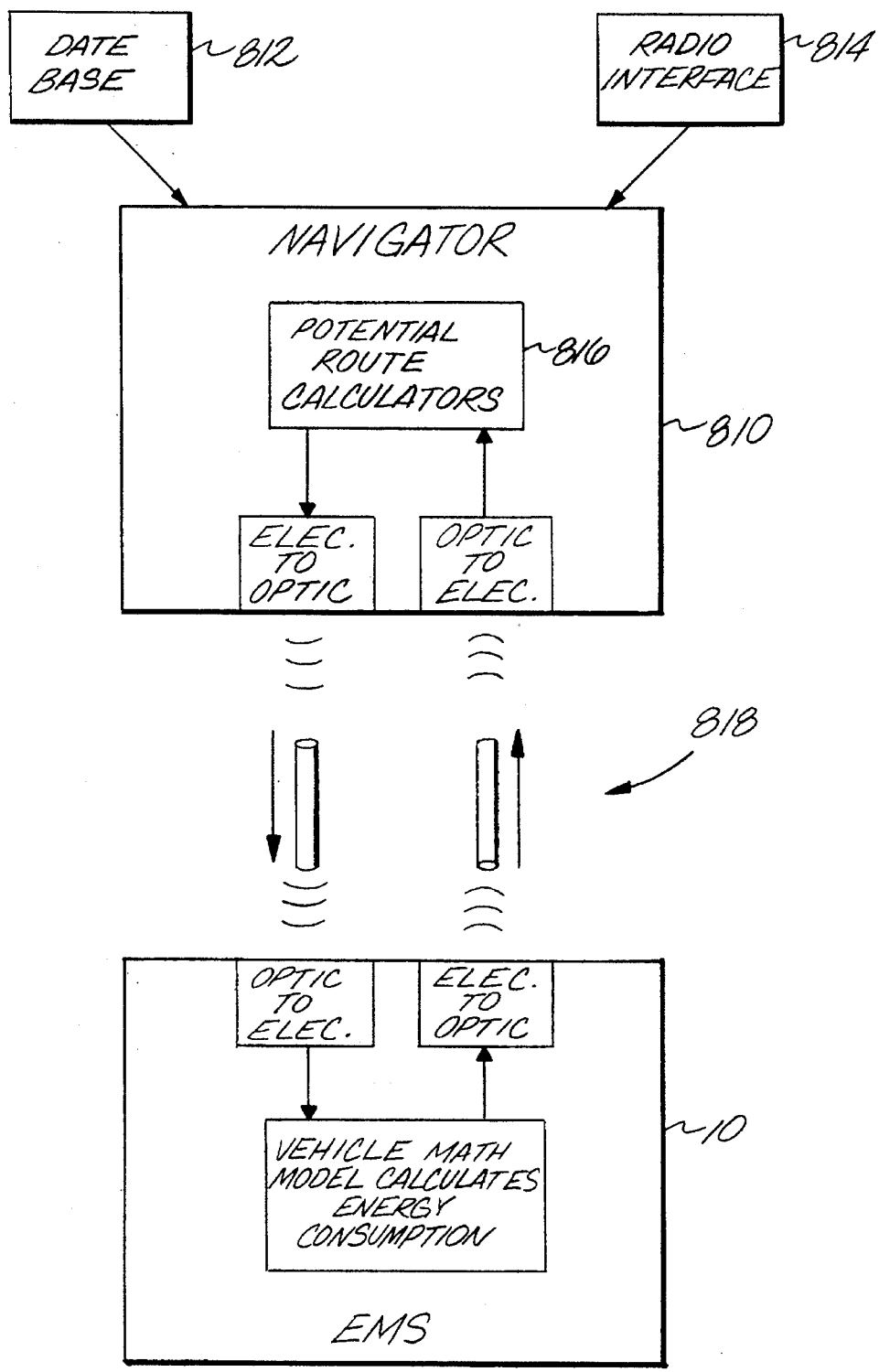

ENERGY MANAGEMENT SYSTEM FOR VEHICLES HAVING LIMITED ENERGY STORAGE

FIELD OF THE INVENTION

The Energy management system of the present invention relates generally to designs for range and performance improvement on modern vehicles having alternative energy storage systems of limited capacity. More particularly, the invention provides for monitoring and assessment of parameters for energy storage system status, vehicle status and multiple driving profiles for determining time, mileage or location of energy system exhaustion, most efficient routes to destination, alternative destinations for recharging the energy system and efficiency improvements for vehicle operation.

BACKGROUND OF THE INVENTION

Environmental pollution is requiring the development and implementation of alternatively powered vehicles to supplement or replace present conventional internal combustion powered passenger vehicles. Recent developments in the technology of electric and other alternative energy vehicles allows performance of those vehicles to approach that of internal combustion engine powered vehicles in all areas with the exception of driving range. Using electric vehicles as an example, present battery technology limits the amount of onboard energy storage available for electric vehicles and the likelihood that limited locations having recharging facilities will be available in the near term requires systems integrated in the vehicle to inform the driver of battery status and driving range available or, alternatively, destinations within range of the vehicle.

Various battery management systems have been proposed in the prior art to estimate the state of charge of the vehicle battery and remaining vehicle range. Examples of these systems are described in the paper by C. C. Chan and K. C. Chu, "Intelligent Battery Management System," presented at the Electric Vehicle Symposium 9, Nov. 13–16, 1988 in Toronto, Ontario, Canada and the SAE technical paper by A. F. Burke, "Evaluation of State of Charge Indicator Approaches for E. V.'s," presented at the International Congress and Exposition of the SAE, Detroit, Mich., Feb. 27–Mar. 3, 1989. These systems are typically very limited in the information provided to the electric vehicle user.

For some time navigation systems have been under development for use with ground vehicles. Exemplary of the prior art in this field are U.S. Pat. Nos. 4,926,336 to Yamada, 4,984,168 to Meukirchner, 4,992,997 to Nimura et al. and 5,121,326 to Moroto et al. Information provided by such prior art navigation systems can be of particular use to electric vehicle operators, however, supplementing of data and calculation routines of the prior art navigators to incorporate information critical for electric vehicle operation would allow use of a navigation system to supply information to the electric vehicle operator for energy efficient route planning and alternative route planning where insufficient range is available from the battery pack in the vehicle.

The present invention combines and improves the prior art systems to provide an energy management system for optimum use of an electric vehicle by allowing the driver to select performance modes, driving profiles and destinations while informing the driver of vehicle status, range, navigational route capability and vehicle efficiency control.

SUMMARY OF THE INVENTION

The present invention is applicable to vehicles employing limited energy storage systems including, but not limited to, battery systems, inertial energy systems and hybrid electric systems. The embodiment disclosed herein employs a battery storage system. The electric vehicle energy management system incorporates an electronics module having a microcontroller for sensing, control and calculation, and memory for maintaining driving profiles, vehicle status information and mathematical models for the vehicle and battery systems. A battery sensor package provides status information to the electronic module for the battery voltage, temperature and current for use with the battery model. Vehicle sensor inputs to the electronic module include temperature inside the vehicle, outside air temperature, temperature of the motor controller, temperature of the motor, speed of the vehicle and acceleration of the vehicle for use with the vehicle model. A driver interface, which incorporates an accelerator pedal and a brake pedal for motion control of the vehicle and a plurality of control buttons for control of the electronic module and a text display for output from the module to the driver. Normal display functions for safe operation of the vehicle, such as speedometer, odometers and battery status are provided from the electronic module, using standard analog or digital displays in an instrument cluster on the vehicle dashboard.

The microcontroller employs the data received from the battery sensor inputs for range calculations based on the battery model stored in the memory. The battery model includes experimentally determined formulas or tables describing the voltage and current relationship over the range of allowable depths of discharge and the model of cycle life based on battery charge and discharge history. The vehicle model incorporates the information from the battery model and the efficiencies of the electric motor, transmission and motor controller as functions of speed, load and temperature as well as losses due to rolling friction, aerodynamics and hill climbing. The microcontroller employs the vehicle model for range and efficiency calculations based on the vehicle sensor inputs. The driving profiles stored in the memory are employed by the microcontroller for calculation of power consumption based on "standardized" driving profiles, such as stop and go, freeway cruising, and hill climbing, or profiles obtained by memorizing the power consumption history of trips unique to the driver of the vehicle. The microcontroller provides calculation for the energy management system to predict range of the electric vehicle based on the driving profile and speed selected by the driver through the driver interface.

In addition to the stored profiles, the energy management system interfaces with a vehicle navigator employing a database of street routes and other static and dynamic navigation information for calculation of energy efficient routes to a destination based on the vehicle model and alternative routes to battery charging stations if the battery condition does not allow sufficient range to reach the desired destination.

The energy management system through its microcontroller provides active control of vehicle systems including the charging system for the battery pack, internal and external lighting systems, heating, ventilating and air conditioning systems for the vehicle and the drive motor controller.

BRIEF DESCRIPTION OF THE DRAWINGS

The present invention is best understood with reference to the following drawings and accompanying detailed description wherein:

FIGS. 7a to 7e are flow diagrams of the interrupt driven data input and output from the vehicle sensors, battery system sensors and displays.

FIG. 8 is a block diagram of the energy management system interface with the vehicle navigation system.

FIG. 9b is a flow diagram of the navigator interface with the energy management system.

DETAILED DESCRIPTION OF THE INVENTION

Figure 1:
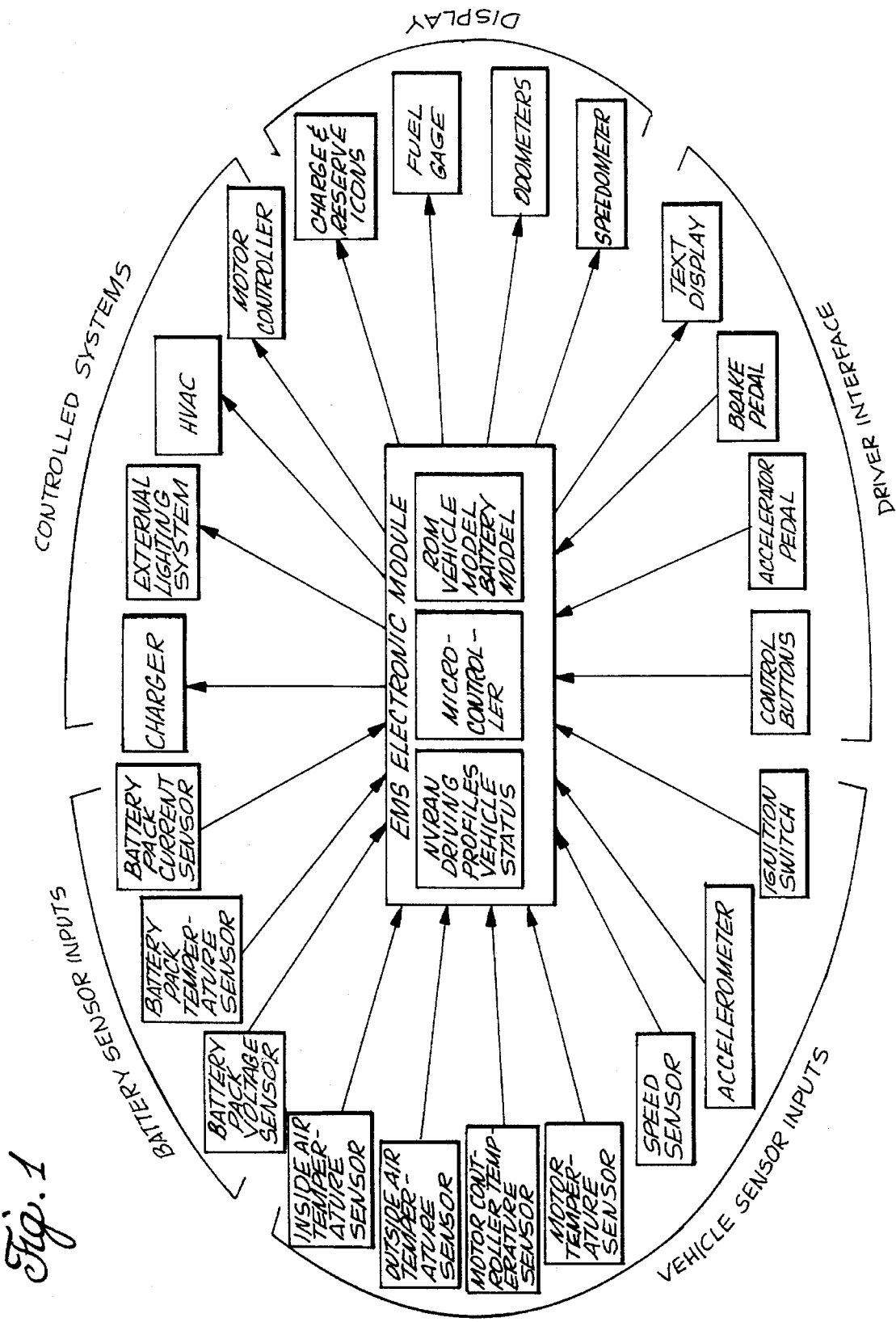
FIG. 1 is a block diagram of the generalized energy management system and the systems and sensors interfaced to the EMS.

Referring to the drawings, FIG. 1 shows the relationship of the energy management system (EMS) to the various sensor inputs, controlled system outputs, driver interface and display for the vehicle. The energy management system electronic module 10 incorporates a micro-controller 12 as a calculation engine and means for controlling the various systems of the electric vehicle. In the embodiment shown in the drawings, an Intel Model 196KR processor is employed. The Memory systems, including a nonvolatile random access memory (NVRAM) 14 and a read only memory (ROM) 16 provide data storage for the microcontroller. As will be discussed in greater detail subsequently, data for driving profiles, vehicle status and operational models including a battery model and vehicle model are stored in the memory. Those skilled in the art will recognize that various memory configurations and combinations may be employed.

The EMS receives inputs from a variety of sensors. Battery sensors including a battery pack voltage subsystem and environment sensor 18, a battery pack temperature sensor 20 and a battery pack current sensor 22, provide information on the battery for use by the EMS. Various vehicle sensor inputs including environmental sensors 24, 26 for inside air temperature and outside air temperature respectively, a motor controller temperature sensor 28, a motor temperature sensor 30, a speed sensor 32 and accelerometer 34 and an ignition switch 36 provide data input to the EMS for the various vehicle systems. The designation "ignition switch" is used for easy understanding by drivers of internal combustion engine vehicles and comprises an on-off switch enabling the operation of the electric vehicle.

The driver interface to the EMS comprises a standard accelerator pedal 38 and brake pedal 40 for direct control of the vehicle. In the present embodiment, a series of four control buttons 42 are employed for control of the EMS system in response to menus displayed for the driver on a text display 44. The various control buttons and their function and the menus associated with the EMS will be described in greater detail subsequently.

Other displays to the driver of the electric vehicle are controlled by the EMS including a standard speedometer 46, trip and continuous odometers 48, a fuel gauge 50 and charge and reserve icons 52. The fuel gauge provides a visual indication of charge remaining in the battery and is again analogized for familiarity to a "fuel" gauge in an internal combustion vehicle. The charge and reserve icons inform the driver of connection of the electric vehicle to a charger for recharging of the batteries and operation of the battery in a reserve mode for very limited distance travel with the battery in an essentially depleted state.

The microcontroller of the EMS is interfaced with various vehicle systems to control their operation. These systems include the motor controller 54 which activates the traction motor driving the electric vehicle. Vehicle subsystem including heating, ventilation and air-conditioning (HVAC) system 56 and external lighting system 58 are sensed and controlled by the EMS based on inputs from the driver interface and energy efficiency considerations as will be described in greater detail subsequently. The charger 60 for the battery in the vehicle is controlled by the EMS to recharge the battery when connected to a charging station.

Figure 2:
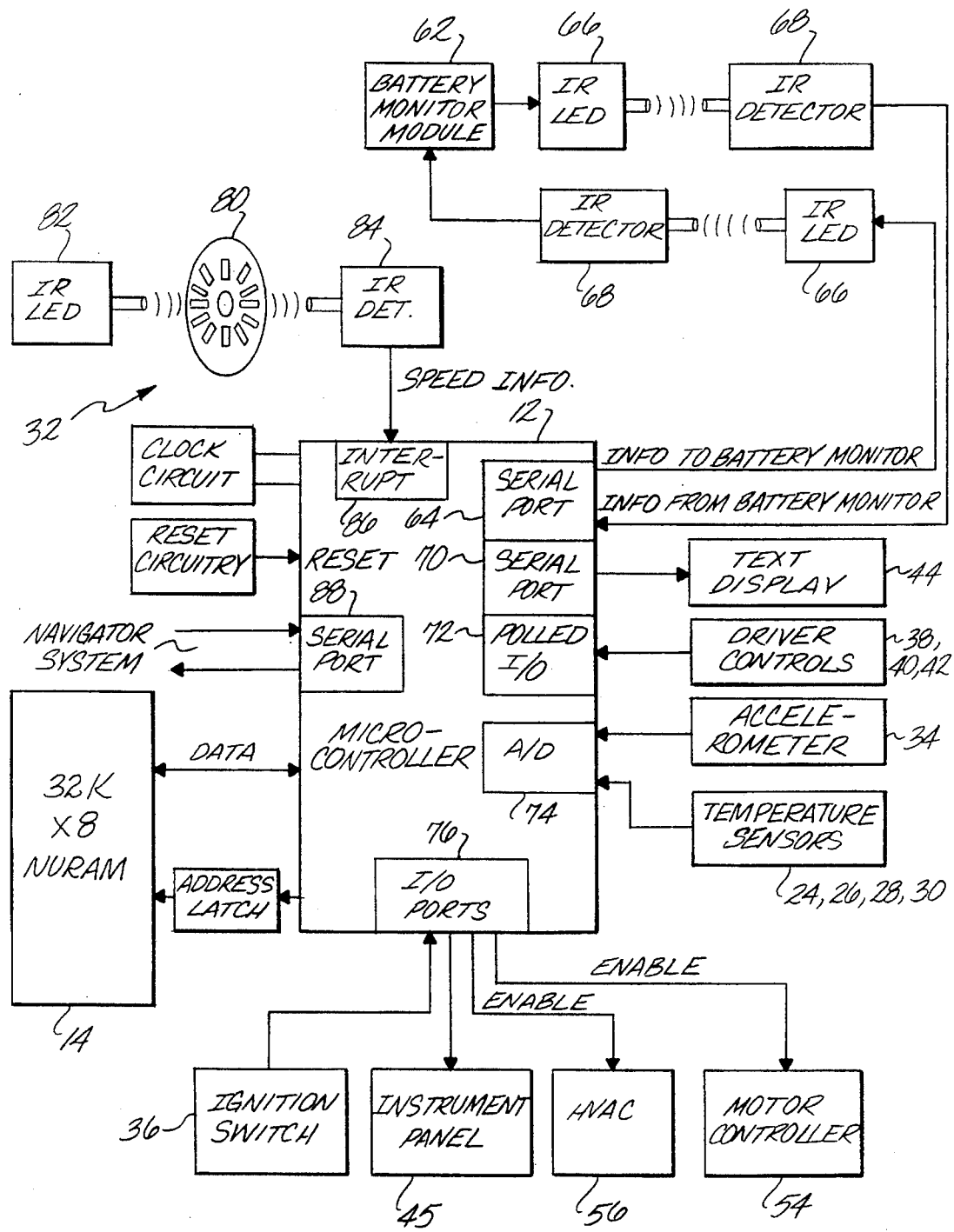
FIG. 2 is a schematic of an embodiment of the energy management system employing a standard microcontroller.

As best seen in FIG. 2 for the present embodiment of the system, the battery sensor inputs and charger system are incorporated in a self-contained battery monitoring module 62 which communicates with the microcontroller through a serial port 64. Those skilled in the art will recognize that the battery monitor circuit module could be an integral part of the EMS itself. An electro-optical interface employing IR LEDs 66 and IR detectors 68 is employed for the battery system. Selection of the charging algorithm to be used in charging the batteries in the electric vehicle is accomplished by the EMS based on input from the driver on available charging time. The microcontroller employs a selection of charging algorithms which takes into account the battery pack history and current state of charge to assist in extending the cycle life of the battery. Battery pack replacement cost is substantial, consequently, this aspect of the EMS provides high-cost efficiency for the electric vehicle. The charging algorithm is altered by the EMS based on input from the driver identifying the amount of time the vehicle will be connected to the charging site. If the vehicle is to be unused for an extended period of time, as an example, the EMS employs a charging algorithm to equalize the battery pack, normally a time consuming charging cycle important to extending battery pack life. If the charging period is shorter, the charging algorithm employed by the EMS is tailored to accomplish maximum charge within the allotted time without degradation of the battery pack life. Battery charging algorithms employed in the present embodiment are exemplified in the publication by Linden, David, *Handbook of Batteries and Fuel Cells*, McGraw-Hill, 1984, pp. 14–79 through 14–92.

State of the art motor controllers provide for returning regenerated power to the energy storage system of the vehicle during electrodynamic braking. In vehicles with energy storage systems comprised of two or more types of storage devices having differing rates of charge and discharge, the EMS, through the I/O port, directs the motor controller to select the particular energy storage subsystem which is to receive the regenerated energy.

Communications with the driver are accomplished by the microcontroller through a serial port 70 to the text display 44 and from the driver controls through a polled I/O port 72. The accelerator pedal 38 and brake pedal 40 as portions of the driver controls are routed through the EMS which converts the inputs made by the driver to output signals enabling the motor controller through a standard I/O port. Control of the motor controller and brakes is accomplished in a standard manner and will not be detailed in this disclosure. The other driver controls comprise the four control buttons 42 previously referenced. In the embodiment shown in the drawings, these buttons comprise a SCROLL key, an ENTER key, a NUMERIC key and an ESCAPE or EXIT key. These key designations are used for easy understanding by those familiar with common computer entry and may employ different names in a preferred embodiment.

Figure 3A:
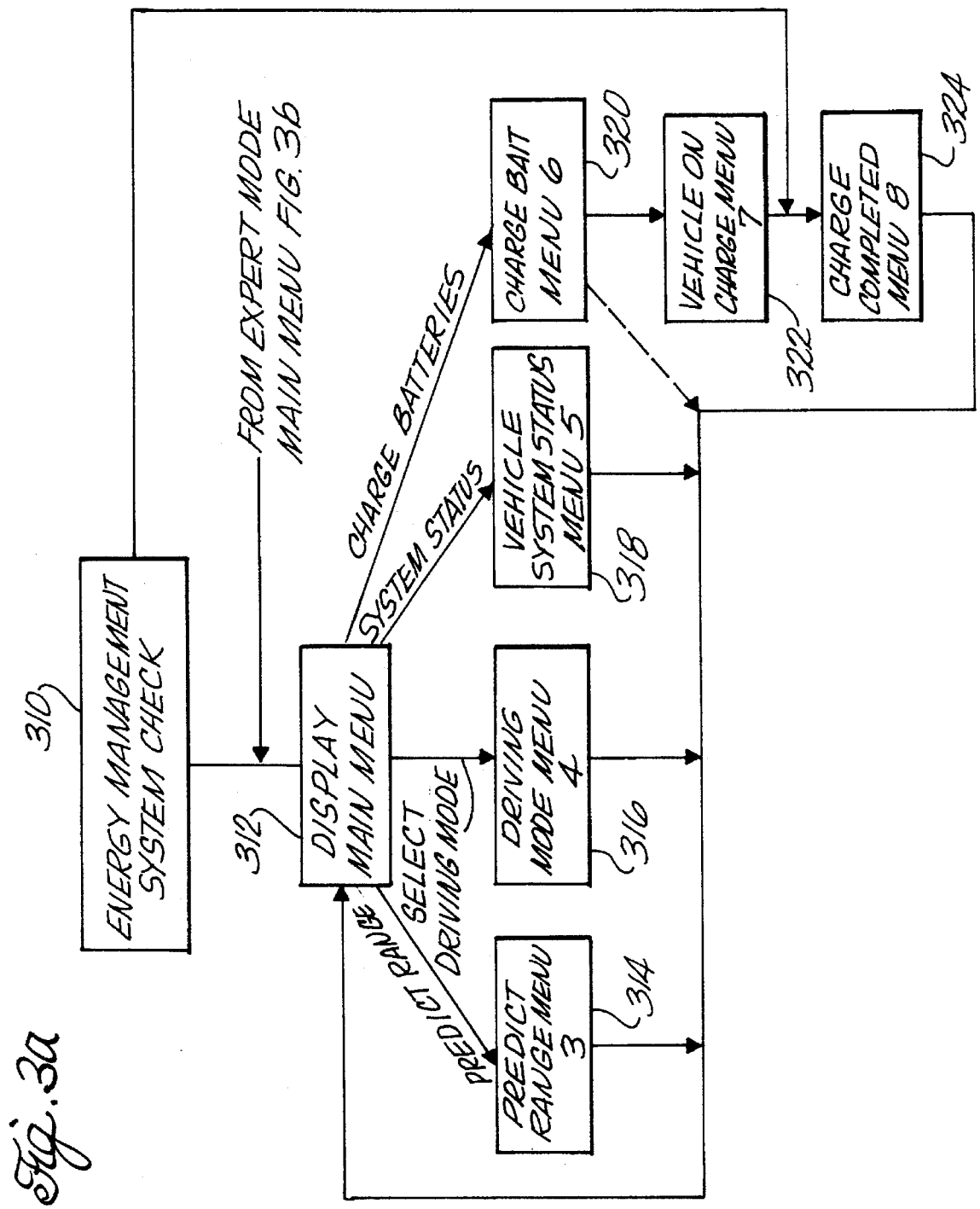
FIGS. 3a and 3b are a block diagram of the menu hierarchy for the text display of the driver interface from the energy management system.
Figure 3B:
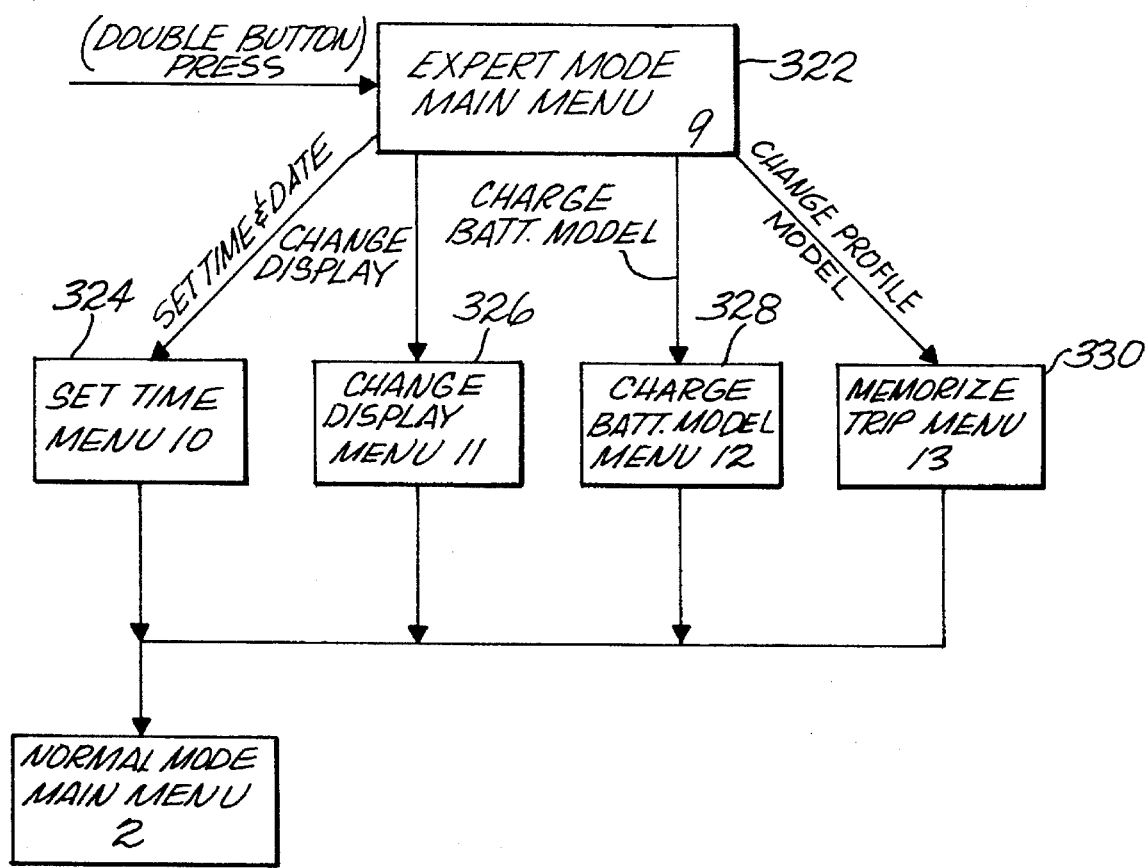

Output to the text display is accomplished in a menu format. The menu hierarchy employed in the present embodiment is shown in FIG. 3a and 3b. Initialization of the system places the EMS microcontroller in the energy management system check identified in block 310. The initial display of the system is the main menu identified in block 312. In the present embodiment, the text display is a four line by twenty character system. Normally the EMS system operates in a "non-expert" (NI) mode. This mode provides simple functional response to the control buttons operated in response to the various menus. The NI mode is initiated by the driver depressing a single control button. The functions available to the driver in the NI mode are predict range, memorize trip, select driving mode, display vehicle status and charge battery. These functions are provided in separate menus identified in blocks 314, 316, 318 and 320, respectively.

If the driver depresses two control buttons simultaneously, the EMS initiates an "expert" (E) mode which provides additional, more complex functions for control of the system. The EXPERT MODE menu represented in block 322 allows the driver to reconfigure the EMS system by setting the time and date represented as a menu in block 324 and change the display identified as menu block 326 which allows a change of the language employed by the display and the units employed (English or metric) by the EMS system and displays. A CHANGE BATTERY MODEL menu represented in block 328 allows the driver to change the battery model or change the charging algorithm for the battery as previously described. The final menu available in the expert mode is the MEMORIZE TRIP menu identified in block 330 which allows the EMS to memorize the energy consumption of a frequently employed driving path for the vehicle.

The various menus of the system are selected by pushing the SCROLL button until the function of choice appears followed by pushing the ENTER button. Once a menu is selected, the various functions of the menu are selected employing the SCROLL button followed by pressing the ENTER button at the desired function to confirm the selection. For various functions, an option is provided to the driver in the form of a numeric value which may be increased through set steps in a wrap-around fashion by pressing the NUMERIC button. The ESCAPE key is provided for the driver to reverse menu selection to return to the next higher menu level. The functions of the EMS as selected from the menus will now be described.

The PREDICT RANGE menu when selected provides a series of choices: "level ground at xx mph," "stop and go," "constant speed uphill at xx mph," "constant speed downhill at xx mph," "constant speed up and down at xx mph" and any one of up to nine memorized trips. The program format of this menu is shown in Table 1. The driver uses the scroll button to select the type of driving profile which he desires. Once the proper profile is displayed, he pushes the enter button to confirm the selection. As an example, if the driver chooses "stop and go" the EMS employs the vehicle model from the ROM with the driving profile for "stop and go" conditions from the NVRAM. The stop and go conditions data employed in the present system is represented by the Simplified Federal Urban Driving Cycle (SFUDS), a copy of which is provided in Table 2. The format of the data required by the EMS to calculate range from either power as a function of time or velocity as a function of time follow that of the SFUDS cycle shown in the listing provided in Table 2. This driving cycle is represented by a series of vehicle velocities at one second intervals over a driving time of six minutes. From this information, the vehicle model calculates the power required at each step and subtracts the energy used at each step from that available in the battery pack as calculated using the battery model from the ROM assuming and initial state defined to the micro-controller of the EMS through the serial port from the battery monitor module. The EMS continues to run the stop and go steps repeating the six minute cycle consecutively until the calculated energy remaining in the battery pack would no longer be able to provide the power for the next step. The distance covered at each step is accumulated and the reported range is that covered at the last successful step. This information is reported to the driver on the display as "range under stop and go conditions is xxx miles."

If the driver selects from the PREDICT RANGE menu, any of the other choices, with the exception of the memorized trip, the speed parameter must be entered by the driver to allow the EMS to make a range prediction. For example, if the driver has selected on the menu "constant speed downhill at xx mph," the numeric key is pressed by the driver to change the desired speed. In the present embodiment as identified in the programming application of Table 1, a minimum speed of 20 mph and a maximum speed of 80 mph is employed. The initial speed displayed in the menu may start with a default value e.g., 30 mph, or the last speed value employed by a selection on the EMS. Pressing the numeric button would increment the speed by, for example, five miles per hour for each button push to the maximum programmable speed at which time the input wraps to the lowest speed e.g., 20 mph. When the driver obtains the speed desired on display, the enter button is pressed and the EMS then employs the vehicle model to predict the range. In this case, the power calculation is based on a constant condition which is derived from a matrix of power required for the given profile and speed selected.

The battery model and vehicle model employed in the present system are based on the electric vehicle battery performance application program DIANE disclosed in the paper entitled: *Users Guide to DIANE Version 2.1: A Micro Computer Software Package for Modeling Battery Performance in Electric Vehicle Applications*, by W. W. Marr, W. J. Walsh and P. C. Symons, June 1990, published by the Energy Systems Division of the Argon National Laboratory. The vehicle model provided in Appendix A of the paper as modified for the present system is disclosed in Appendix A to this application. Data employed in the battery model by the present embodiment are included as Appendix B to this application. The result of the calculation by the EMS based on the vehicle model for the selected profile is displayed as, for example, "range under constant speed of xx mph downhill is xxx miles."

If the driver selects from the PREDICT RANGE menu, one of the memorized trips, the calculation made by the EMS employs the stored table of energy consumption versus time as input to the vehicle mathematical model. After calculation, the resulting display based on the existing battery charge would be "trip number x can be successfully completed z times with yyy miles remaining." This format allows use of the EMS system for a standard commute allowing the driver flexibility in selecting charging times for the vehicle.

Figure 4A:
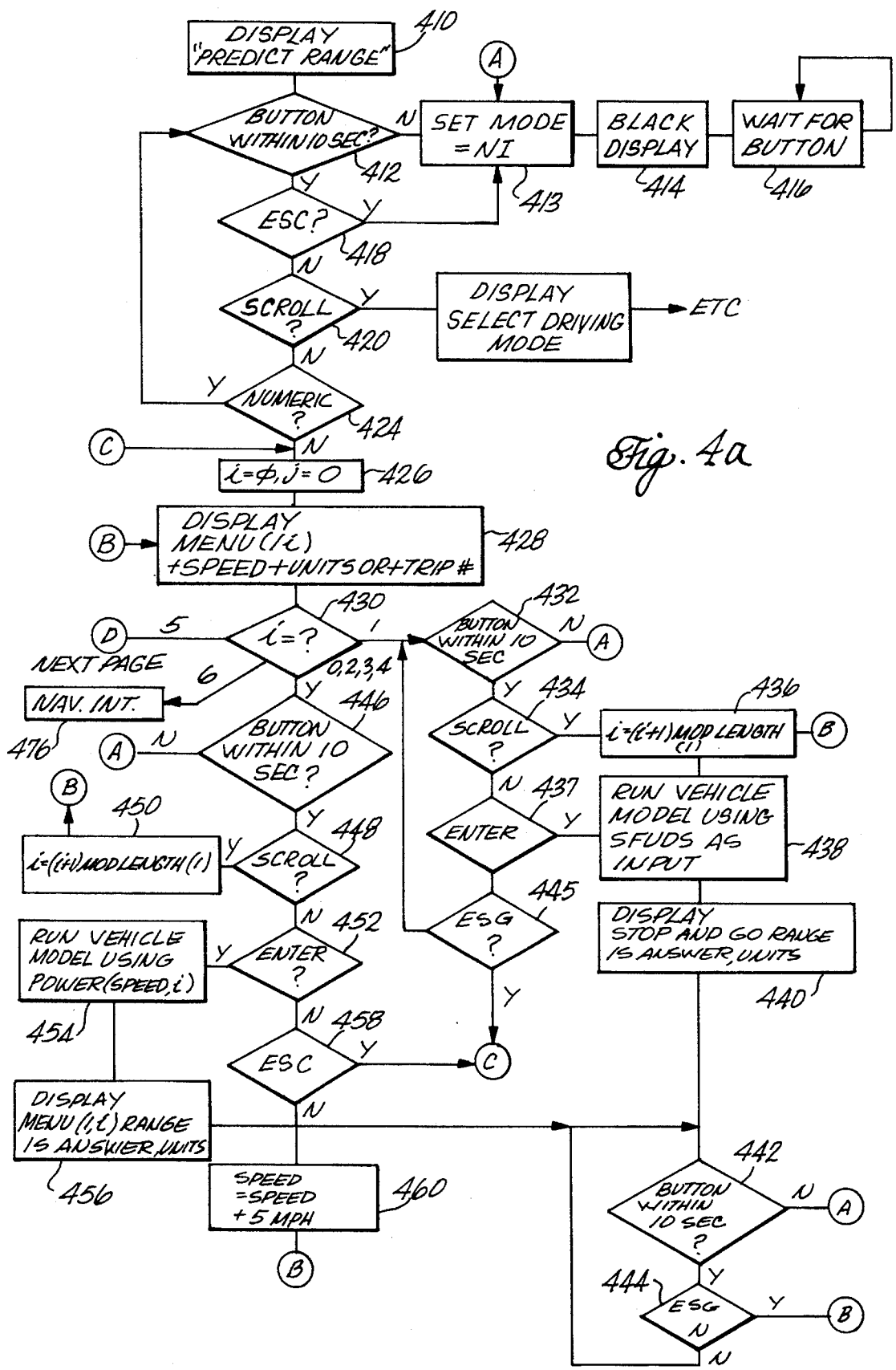
FIGS. 4a and 4b are a flow diagram for range prediction by the energy management system.
Figure 4B:
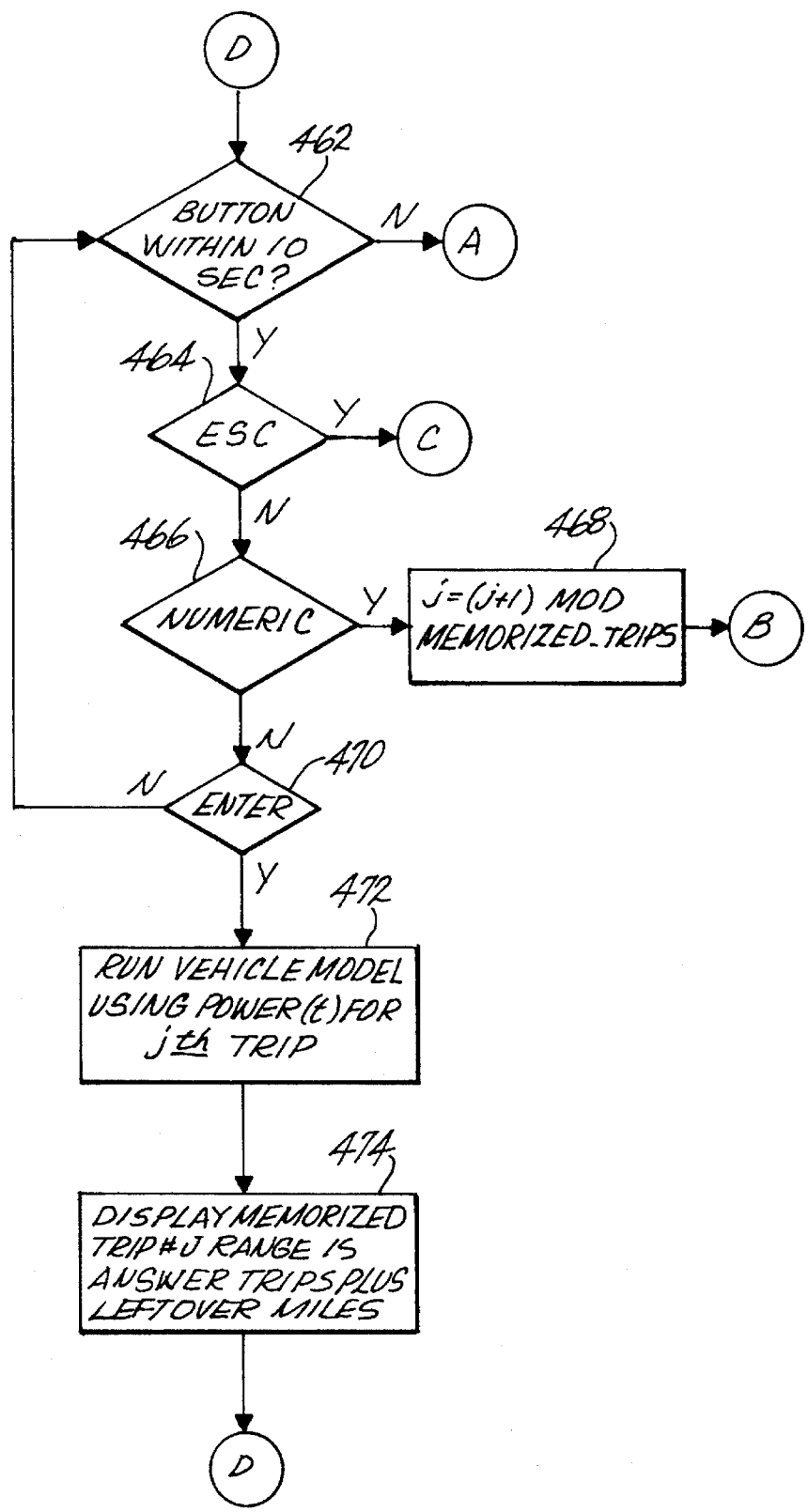

A flow diagram of exemplary programming for operation of the EMS in the PREDICT RANGE menu is shown in FIGS. 4a and 4b. Data formats for this program sequence are shown in the listing provided in Table 1. The EMS displays the PREDICT RANGE menu on the text display as shown in box 410 for review by the driver. The EMS microcontroller monitors the driver interface control buttons to determine if a control button has been pressed within ten seconds as shown by the decision block 412. If no button has been pressed, the EMS sets the mode of operation to the non-expert (NI) mode for operation in block 413, blanks the display 414, and enters a wait routine for 416 for button sensing. Returning to the decision block 412 if a button has been pressed, the microcontroller determines if the ESCAPE key has been pressed, block 418. If so, the program returns to block 412, setting the system to the NI mode. If the ESCAPE key is not the key pressed, the microcontroller determines if the SCROLL key has been pressed in block 420. If the SCROLL key has been depressed, the microcontroller moves to display the next menu as identified in block 510. If the SCROLL key has not been depressed, the EMS determines if the NUMERIC key has been depressed in block 424. The NUMERIC key has no significance in this menu pattern and if the numeric key has been depressed, control is returned to block 412 as if no button had been pressed. If the button pressed is the ENTER key, by default the program proceeds to block 426 and sets the parameters i and j=0. The microcontroller then displays the scrolled menus identified in Table 1 in the form of menu (1,i) and appends the speed and units or the trip number as shown in block 428. For example, if the menu pointer is at menu (1,2) the display will show "uphill at xx mph." If, however, the menu pointer is at menu (1,5) the display will show "memorize trip # x." After displaying the menu, the controller enters decision block 430. If the second index of the menu pointer equals one, the microcontroller proceeds to decision block 432 to await a button press. If no button is pressed within ten seconds, the microcontroller returns to entry point A at block 413. If a button has been pressed, the microcontroller determines if the SCROLL key is pressed in decision block 434. If the SCROLL key has been depressed, the second index of the menu pointer i is incremented in block 436 with a counter operating modulo 7. The counting modulus, length (x), for the various counters described are shown in Table 1. Upon incrementing of the menu index, the program returns to entry point B at block 428 to display the new menu. If the SCROLL key was not the button pressed, the microcontroller continues to decision block 437 to determine if the ENTER key was pressed. If the ENTER key was pressed, selecting the menu having pointer equal 1, the driver has selected the "stop and go" menu. In this case, the microcontroller retrieves from memory the vehicle model and employs the SFUDS data as a driving profile to determine vehicle range as shown in block 438. Upon completion of the calculation, a display of "stop and go range is" accompanied by the result of the calculation and the appropriate units as shown in block 440. If no further button is pressed within ten seconds, the program returns to entry point A as shown in block 442. If after the display of the stop and go answer the ESCAPE key is pressed as detected in block 444, the program returns to entry point B at block 428 to display the previous menu.

If the ENTER key was not pressed, in block 436, the program determines if the ESCAPE key was pressed in block 445. If the ESCAPE key was not pressed, the only key remaining is the NUMERIC key which has no meaning for the menu pointer of 1 since no numeric input is required by the driver. Consequently, control is returned to block 432 to await an additional button press. If the ESCAPE key has been pressed, the menu pointer is reset to 0 and control of the program returns to entry point C.

Returning to block 430, if the second index of the menu pointer is 0, 2, 3, or 4, additional entry for the speed desired is required by the driver. Consequently, the microcontroller waits for a button push as identified in block 446. If a button push does not occur within ten seconds, control of the program returns to entry point A. If a button is pushed within ten seconds, the controller determines in block 448 if the SCROLL key has been pressed and if so, increments the menu pointer in block 450 and returns to entry point B to display the next menu. If the SCROLL key is not pressed, the controller determines if the ENTER key has been pressed in block 452. If the ENTER key has been pressed, the vehicle model is run using the matrix data for required power at the speed initially displayed in the menu as shown in block 454. Upon completion of the calculation, the selected driving profile and the range associated with that profile is displayed as shown in block 456. For example, if the menu pointer was 0 providing the menu selection "level at xx mph" the display will show "level at xx mph range is yy miles."

If the ENTER key was not depressed, the microcontroller determines if the ESCAPE key was pressed in block 458. If the ESCAPE key was pressed, the menu pointer is reset to 0 and the program returns to entry point C.

If the ESCAPE key was not pressed by default, the pressed key was the NUMERIC key resulting in incrementing of the numeric speed value as shown in block 460. The program then returns to entry point B and the display for the given menu pointer is again provided with the incremented speed value.

Returning to block 430, if the second index of the menu pointer equals 5 signifying selection of a memorized trip, the program transitions to entry point D of FIG. 4b. The microcontroller determines if a button has been pressed in block 462 and if no button is pressed within sixty seconds, the program returns to entry point A. If a button has been pressed, the microcontroller determines in block 464 if the ESCAPE key was pressed. If the ESCAPE key was pressed, program control returns to entry point C. If not, the program determines in block 466 if the NUMERIC key was pressed. If the NUMERIC key was pressed, the memorized trip variable j is incremented as shown in block 468. Incrementing of j is accomplished with a counting modulus "memorized trips" equal to the number of segmented memory locations provided for memorizing trip data. Control of the program then returns to entry point B.

If the microcontroller determines that the ENTER key has been pressed in block 470, the identified, memorized trip present on the display screen has been selected by the driver and the microcontroller calculates the power required for the identified trip as shown in block 472. Upon completion of the calculation, the microcontroller displays the results of the calculation in the format "memorized trip number j range is yy trips plus xx miles" as shown in block 474. Control of the program then returns to entry point D allowing additional calculation of memorized trip information.

Returning to decision block 430, if the second index of the menu pointer equals 6, the EMS performs a data exchange and interaction with a navigator system in block 476 to provide predictions of energy availability in the battery system for routes defined by the navigator. Further description of the navigator system interaction is provided in detail subsequently.

The SELECT DRIVING MODE menu allows the driver to select either a "economy," or "performance" mode for the EMS in operation of the vehicle. Normally during driving, the driver is not interacting with the EMS and therefore the display is blank so as not to distract the driver. The EMS is continually monitoring various inputs from the vehicle as previously described. Inefficient energy usage by vehicle systems monitored by the EMS can be detected. As an example, if the microcontroller of the EMS receives an input from an environmental sensor, the external temperature sensor, indicating high outside temperature and an indication from a subsystem sensor the window position sensor, that the windows are rolled down, operation of the air conditioner in attempting to cool the vehicle would be inefficient. The input from the external temperature sensor indicating high outside temperature and the window position sensor indicating rolled down windows comprises an indication of inconsistency between the subsystem sensor and environmental sensor for efficient energy consumption. This inconsistency is detected by the micro-controller as a predetermined condition precluding efficient use of the air conditioner. In a direct control format as shown in the drawings for the present embodiment, the HVAC system controlled by the EMS through the I/O port could be disabled until the windows are closed. In addition, (or alternatively) the EMS may display to the driver, a message "roll up windows."

In the embodiment shown in the drawings, external analog sensors, such as the temperature sensors and accelerometer, are provided to the microprocessor through a multiplexed Analog to Digital input port 74 as shown in FIG. 2. Standard controls for the HVAC and motor controller as exemplary are provided through standard I/O ports 76.

Selection of the "performance" mode from the driving mode menu suppresses the EMS monitoring of efficiency information and precludes display of energy efficient messages to the driver. As previously described, selections in the SELECT DRIVING MODE menu are accomplished by pushing the ENTER button followed by depressing the SCROLL button for selection between the sub-menu items of "economy," or "performance" followed by pushing the ENTER button to confirm the selection. In the embodiment of the present invention, the default driving mode is "economy."

Figure 5A:
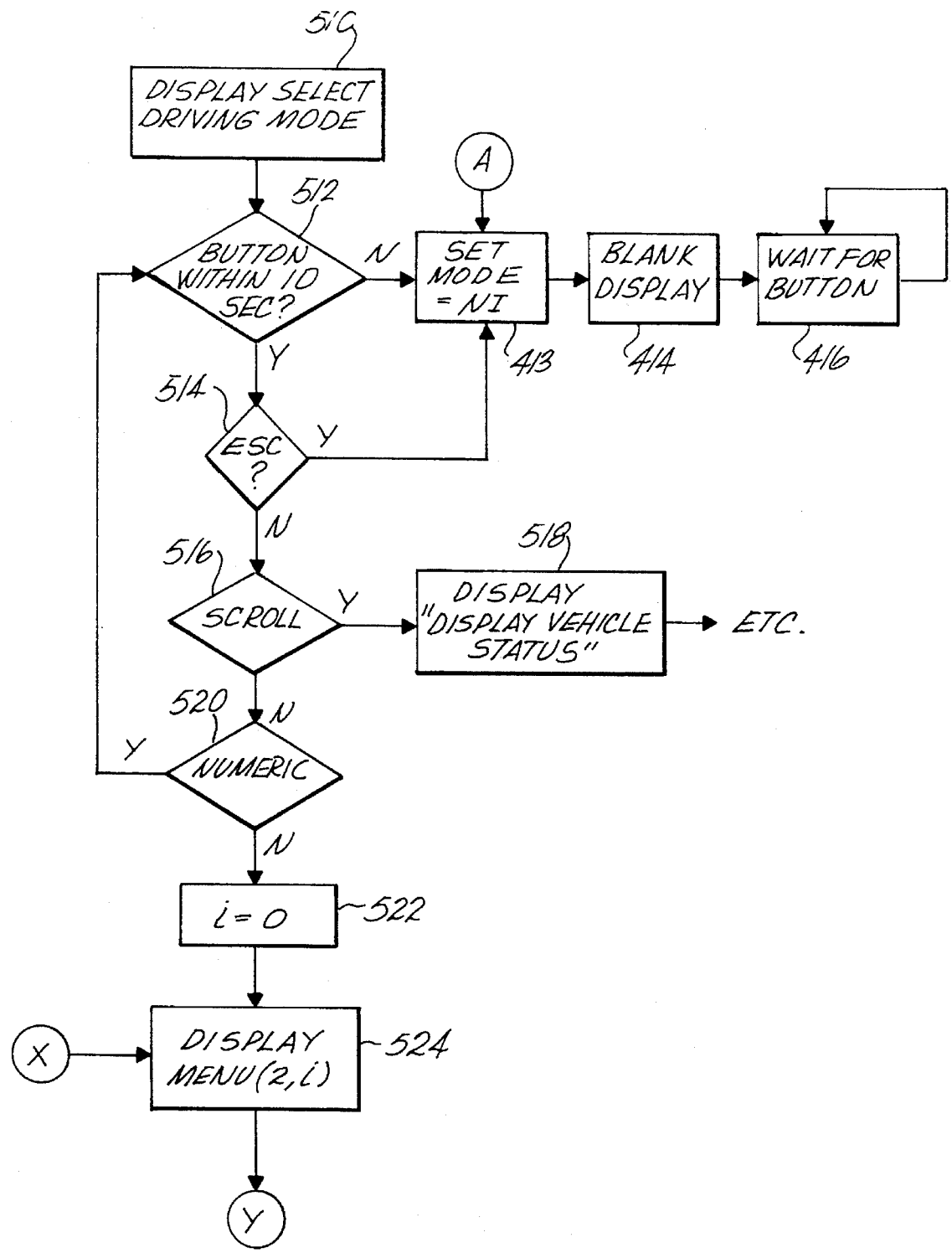
FIGS. 5a and 5b are a flow diagram for selection of the driving mode.
Figure 5B:
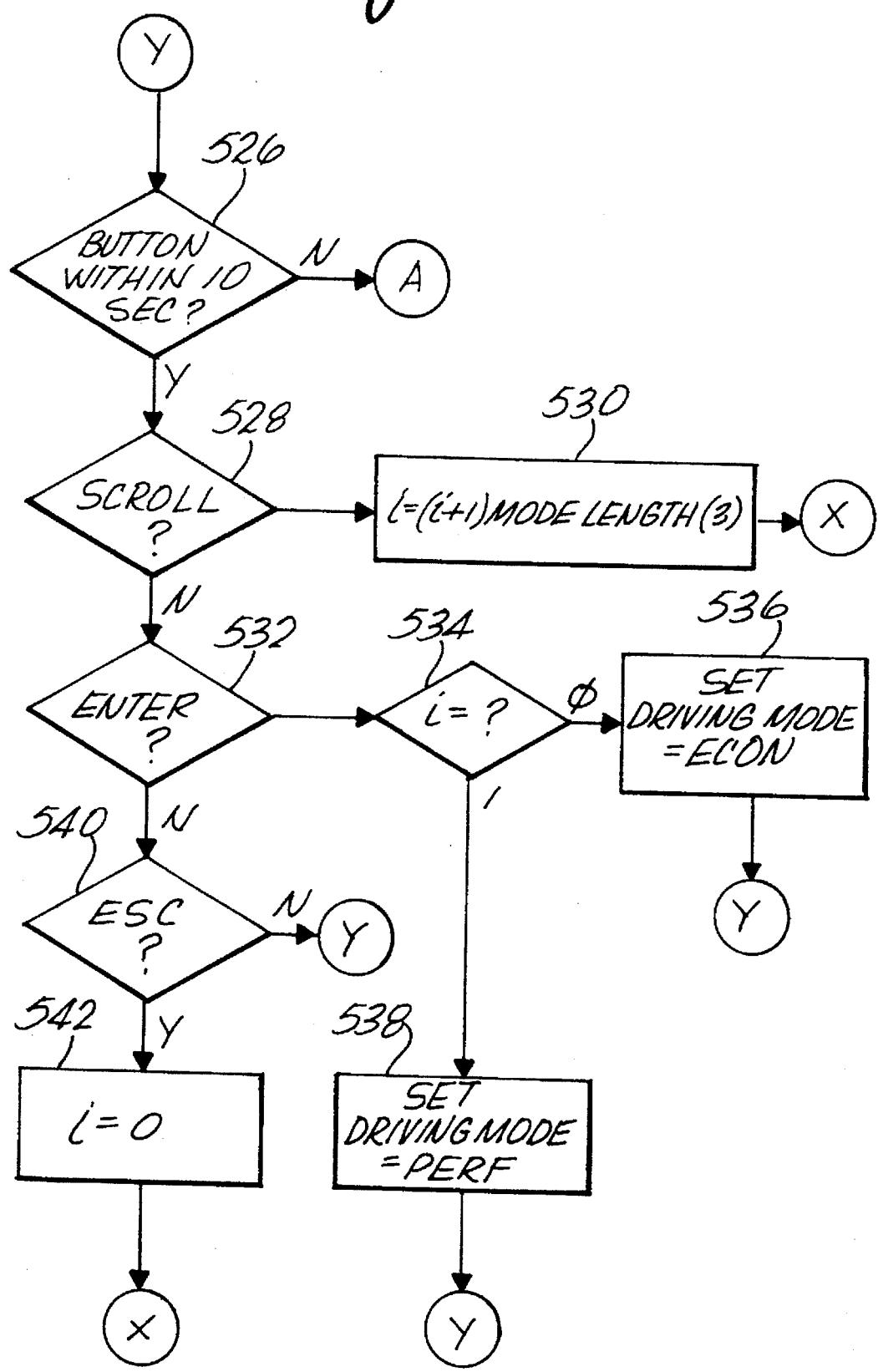

FIGS. 5a and 5b are a flow diagram of programming associated with the SELECT DRIVING MODE menu. The SELECT DRIVING MODE menu is displayed on the text display by the microcontroller as shown in block 510. The microcontroller determines if a button has been pressed as shown in decision block 512. If no button is pressed within ten seconds, the microcontroller places the system in the nonexpert mode, blanks the display and waits for a button press as previously described with respect to FIG. 4a. Similarly, if the microcontroller determines in block 514 that the ESCAPE key has been pressed, exiting the SELECT DRIVING MODE menu, the microcontroller will return to its initial state.

If the SCROLL button has been pressed as shown in block 516, the next menu DISPLAY VEHICLE STATUS will be displayed as shown in block 518. If the NUMERIC key is depressed as shown in block 520, the input is ignored since the NUMERIC key has no meaning at this menu level. If by default the ENTER key has been depressed confirming the "select driving mode" decision by the driver, the second index of the memory pointer is set to 0 as shown in block 522 and the microcontroller displays the sub-menu as shown in block 524. The displays of the sub-menu identified for the menu pointer having a first index 2 are shown in Table 2.

The microcontroller again senses a button push as shown in block 526 and determines if the button pressed is the SCROLL button as shown in block 528. If the SCROLL button has been depressed, the menu pointer is incremented as shown in block 530 and the new sub-menu is displayed by return through entry point X.

If the SCROLL key was not depressed, the microcontroller determines if the ENTER key was depressed in block 530. Depressing the ENTER key confirms the selection by the driver of the displayed sub-menu and, as shown in block 534, if the second index of the menu pointer equals 0, the microcontroller establishes the driving mode as "economy" defined in block 536. While if the second index of the menu pointer equals 1, the microcontroller sets the driving mode to "performance" as shown in block 538. If the ESCAPE key has been depressed as shown in block 540, the second index of the menu pointer is reset to 0 and the program returns to entry point X.

The DISPLAY VEHICLE STATUS menu allows the driver to examine the status of the data inputs and outputs of the EMS. For example, selecting the DISPLAY VEHICLE STATUS by pressing the ENTER button would allow a display of inside air temperature, outside air temperature, motor temperature, battery pack temperature, controller temperature, instantaneous battery pack voltage, instantaneous battery pack current draw and any values calculated by the EMS from these parameters. With the limited display size in the present embodiment, the DISPLAY VEHICLE STATUS selection provides sub-menus with one or more of the displayed values, e.g. "outside air temperature is xx." Sequential display of the various status items is accomplished by pressing the SCROLL button.

The CHARGE BATTERY menu allows the driver to inform the EMS of the desired charging time to allow optimum charging of the battery by the EMS for that time. For example, if the driver is running into the store for groceries and the vehicle is attached to a charging station at the store, the vehicle will only be on charge for a few minutes. If on the other hand, the driver has parked the vehicle in his home garage, it may be left for a number of hours. Slow charging is easier on the battery pack than fast charging. Consequently, the EMS would direct different charging algorithms to be used depending upon the length of time available to charge. Invoking the CHARGE BATTERY function from the main menu by pushing ENTER causes a prompt of "charge battery for xx hours" to appear. The driver can modify the numeric value by pressing the NUMERIC button as described previously. The ENTER button is then pressed to establish the time available for charging to the EMS. The EMS then selects an appropriate algorithm based on predetermined hour values and proceeds to charge the vehicle. In the present embodiment, if a particular time is not established by the driver through the use of this function, the EMS will employ an algorithm based upon the optimum charging efficiency for the present state of the battery.

As shown in FIG. 3a, subsequent to establishing the charging procedure through the CHARGE BATTERY menu, the EMS provides a VEHICLE ON CHARGE menu 332 for providing information on the battery charging status. In addition, upon completing the battery charging cycle, a CHARGE COMPLETED menu 334 is provided for notification of the driver of a charge and battery status prior to reentering the MAIN DISPLAY menu.

As previously described, the expert menu functions entered through the EXPERT menu 322 allow modification and control of the EMS by the driver. The SET TIME menu is self explanatory and allows the driver to update the EMS system with current time and date. The CHANGE DISPLAY menu allows sub-menus of SELECT LANGUAGE and SELECT UNITS. The SELECT LANGUAGE menu in the E mode causes a series of languages to appear one at a time on the display. The driver selects the desired language for use on the EMS displays by pressing the SCROLL button and confirming the choice with the ENTER button. The information on language choice is saved in the NVRAM and the chosen language is used until changed by an alternate selection using the CHANGE DISPLAY menu. All messages described in the various menu functions are encoded in all languages available. These messages are stored in the microcontroller ROM. The SELECT UNITS function of the change display menu operates in the same manner as the SELECT LANGUAGE function to allow selection of English or metric units for display. For example, selection of the English system will display miles and miles per hour, while the metric display will display kilometers and kilometers per hour.

The CHANGE BATTERY MODEL and CHANGE CHARGING ALGORITHM functions are provided to allow modification of the numeric parameters for changes of battery types, aging of the batteries and other altered operating parameters for the vehicle.

The final menu provided in the E mode is the MEMORIZE TRIP menu. This function is selected by the driver to memorize the energy consumption of a particular trip which will be accomplished on a repetitive basis to allow prediction by the EMS for successfully accomplishing that trip with existing battery charge. Upon selection of the memory function, the display shows "memorize trip number x." If the driver now pushes the ENTER button, the EMS will ask for an indication of when to start memorizing battery power consumption data. This is accomplished by displaying "memorizing trip number x" and, on the next line of the display, "start" indicating that the next depression of the ENTER button will cause the EMS to begin memorizing energy consumption. During memorization, the power drain by the vehicle is sampled periodically (in the present embodiment, once per second). This power requirement is saved in a table along with the amount of time this amount of power was required. The power is determined by monitoring the battery pack current and voltage and calculating a product of the instantaneous values. Once the enter button is pushed and the memorization is in progress, the word "start" is replaced on the display by the word "stop" indicating that a subsequent push of the ENTER button will cause the memorization to stop. A variation on this process is accomplished if the trip number x has already been memorized. If the driver selected that trip number, the EMS assumes that the driver wishes to replace the information previously memorized by information for a new trip. In this case, the display shows "replacing trip number x" along with the start or stop indications. In the present embodiment, up to nine trips can be memorized. Whenever a trip is memorized, the resulting data table of energy consumption allows range prediction without requiring calculation based on the vehicle model. Since the energy consumption for the trip is already known, prediction is accomplished by subtracting the energy consumption from the available energy in the battery pack for each time step of the table. The tabular information for the memorized trips is stored in the NVRAM. Limitations on the number of stored trips is imposed by memory size.

Figure 6A:
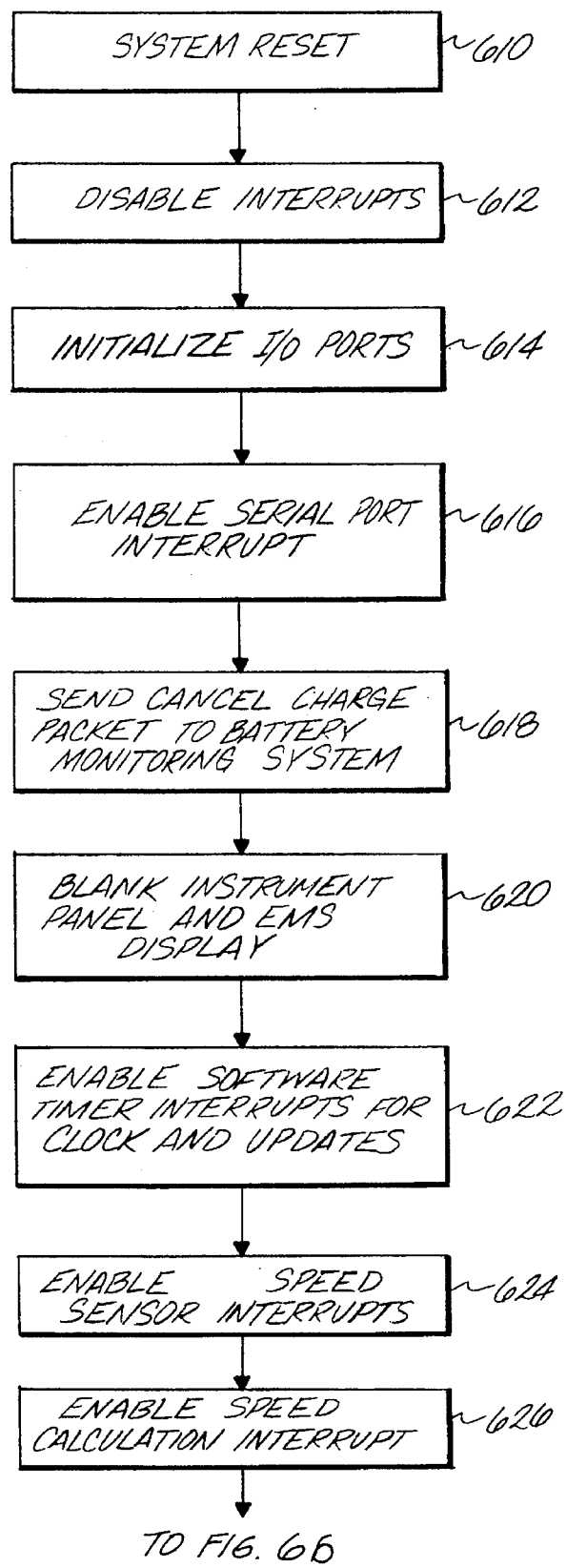
FIGS. 6a and 6b are a flow diagram of the general control program for the energy management system microcontroller.
Figure 6B:
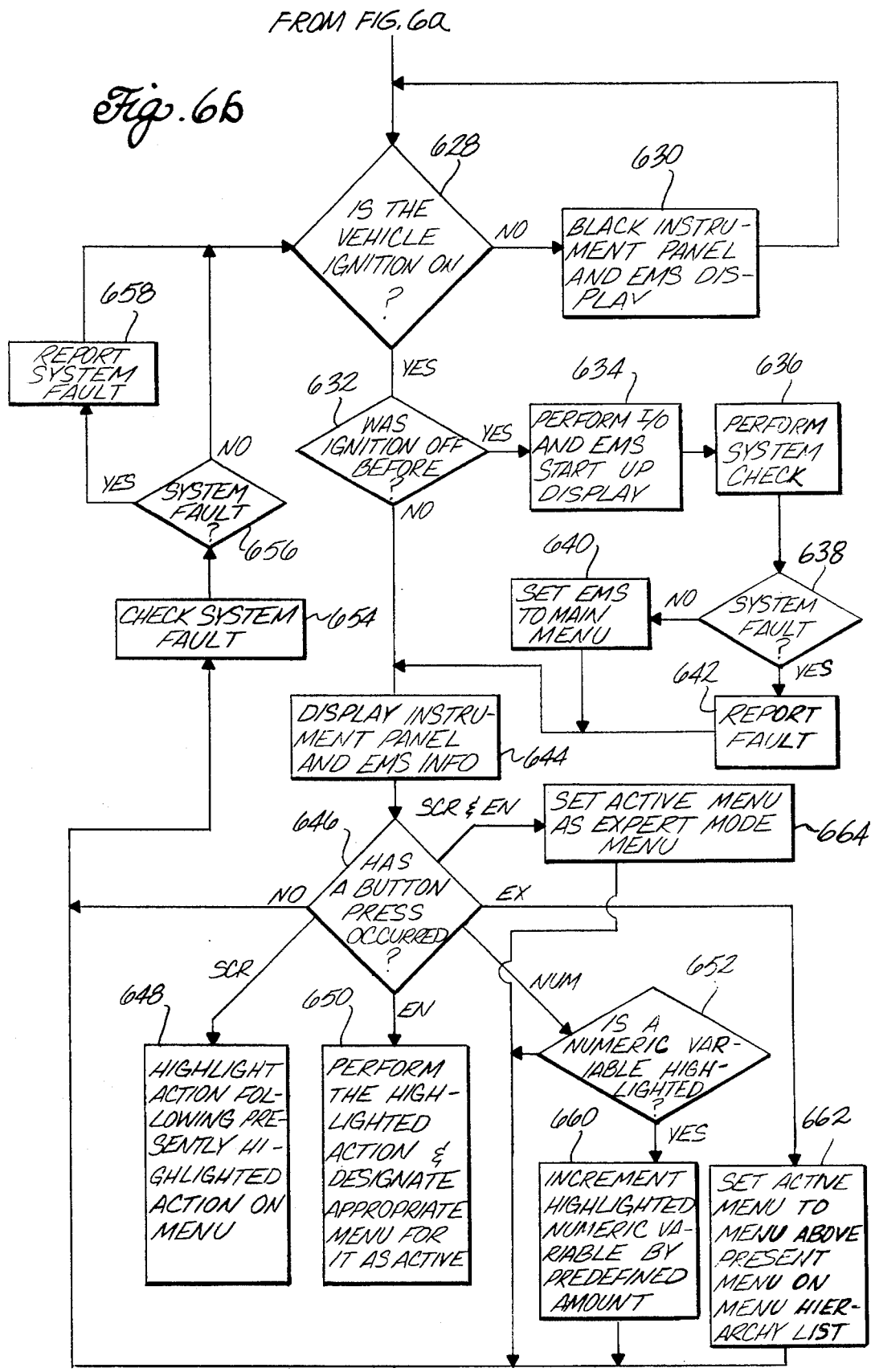

Details of the overhead for the operating system of the microcontroller in the present invention are shown in FIGS. 6a and b and 7a–e. The microcontroller for the present embodiment initiates operation with a system reset 610 as shown in FIG. 6a. Interrupts are disabled 612 while initialization of the input output ports 614 is accomplished. As previously described with respect to FIG. 2, the I/O ports 76 provide the data paths for communication between the microcontroller and the ignition switch, instrument panel 45 (comprising the various display elements including the speedometer, odometers, fuel gauge and charge and reserve icons), the HVAC controller and the motor controller.

After initialization of the I/O ports, the serial port interrupt (PTS) is enabled for communication through serial port 64 and of FIG. 2. The microcontroller communicates with the battery monitor module through the serial port providing a "cancel charge packet" data block to the self contained battery monitor module as a reset. See block 618. The microcontroller then blanks the text display through serial port 70 and the instrument panel through the I/O ports. See block 620.

The microcontroller next enables the software timer interrupts 622 to allow interface with the clock circuit 78 of FIG. 2 for generalized program clocking. The speed sensor interrupt is enabled 624 for communication with the speed sensor. In the present embodiment, the speed sensor comprises a slotted wheel 80 shown in FIG. 2 located on a drive axle of the vehicle, an IR light emitting diode 82 providing an illumination source through fiber optic cable to one side of the slotted wheel and an IR detector 84 connected through fiberoptic cable receiving signal from the opposite side of the slotted wheel. The signal from the IR detector, representative of the rotational speed of the axle, is provided to an interrupt port 86 in the microcontroller.

The microcontroller enables the speed calculation interrupt 626 as a final preoperation function.

The microcontroller senses the status of the vehicle ignition switch in decision block 628. If the switch is not "on" indicating desire for operation of the vehicle by the driver (or turning off of the ignition switch since the last calculation cycle) the microcontroller continues to blank the instrument panel and EMS text display as shown in block 630. Upon sensing that the ignition switch has been turned on, the microcontroller determines in block 632 if the ignition switch was previously "off". If the ignition switch was previously "off", the microcontroller performs an instrument panel and EMS startup display 634 and performs a system check 636 to detect hardware faults. If no fault is detected in block 638, the microcontroller sets the text display to the main menu previously described with respect to FIG. 3 in block 640. If a system fault was detected, the fault is reported 642 by appropriate annotation of the text display.

Upon completion of the startup sequence, or if the ignition switch was not previously "off", the microcontroller displays the instrument panel and EMS information 644 corresponding to the various sensor inputs. The microcontroller monitors the control buttons to determine if a button has been pressed 646 and if the SCROLL button has been pressed, highlights the action following the presently highlighted action on the menu 648 to scroll through the menus as previously described with respect to FIGS. 3, 4, and 5. If the ENTER key has been pressed, the microprocessor performs the highlighted action and designates the appropriate menu for the highlighted action as active 650, also previously described with respect to FIGS. 3, 4 and 5. If the NUMERIC key has been pressed, the microprocessor determines if a numeric variable is highlighted in the menu 652. If no numeric variable is highlighted, depressing the NUMERIC key has no function. A system check for faults is accomplished 654 and if a system fault is detected 656, the system reports the fault 658, program control then returns to block 628.

If a numeric variable is highlighted in block 652 and the NUMERIC key is pressed, the highlighted numeric variable is incremented by the count modulus 660 as previously described with respect to FIGS. 4 and 5.

If the ESCAPE key is pressed, the microprocessor sets the active menu to the menu above the present active menu on the menu hierarchy list in block 662 as previously described with respect to FIGS. 3, 4 and 5.

if the SCROLL and ENTER keys are depressed simultaneously, the microcontroller sets the active menu as the EXPERT MODE menu as shown in block 664 and previously described with respect to FIG. 3.

Figure 7A:
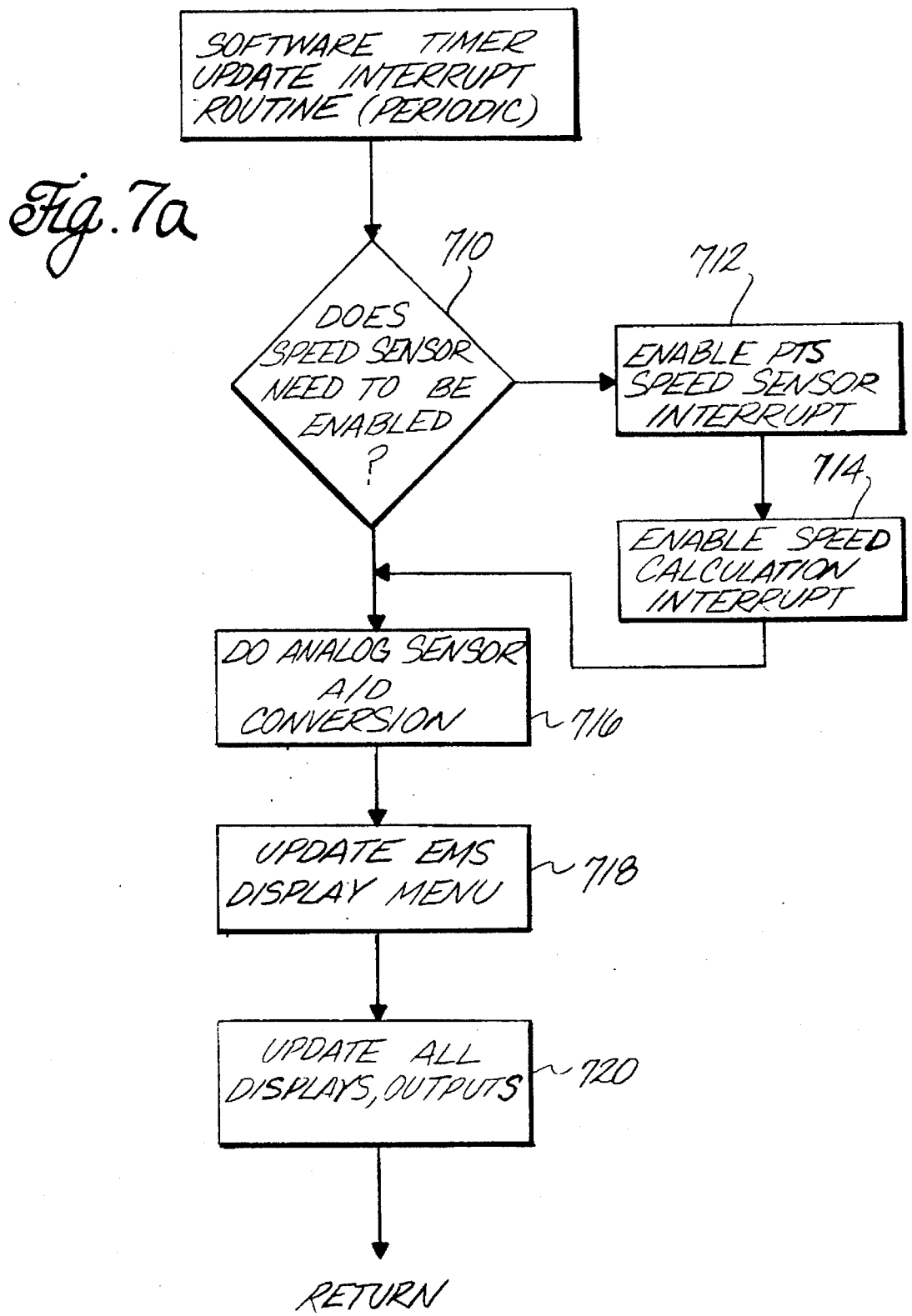
Figure 76:
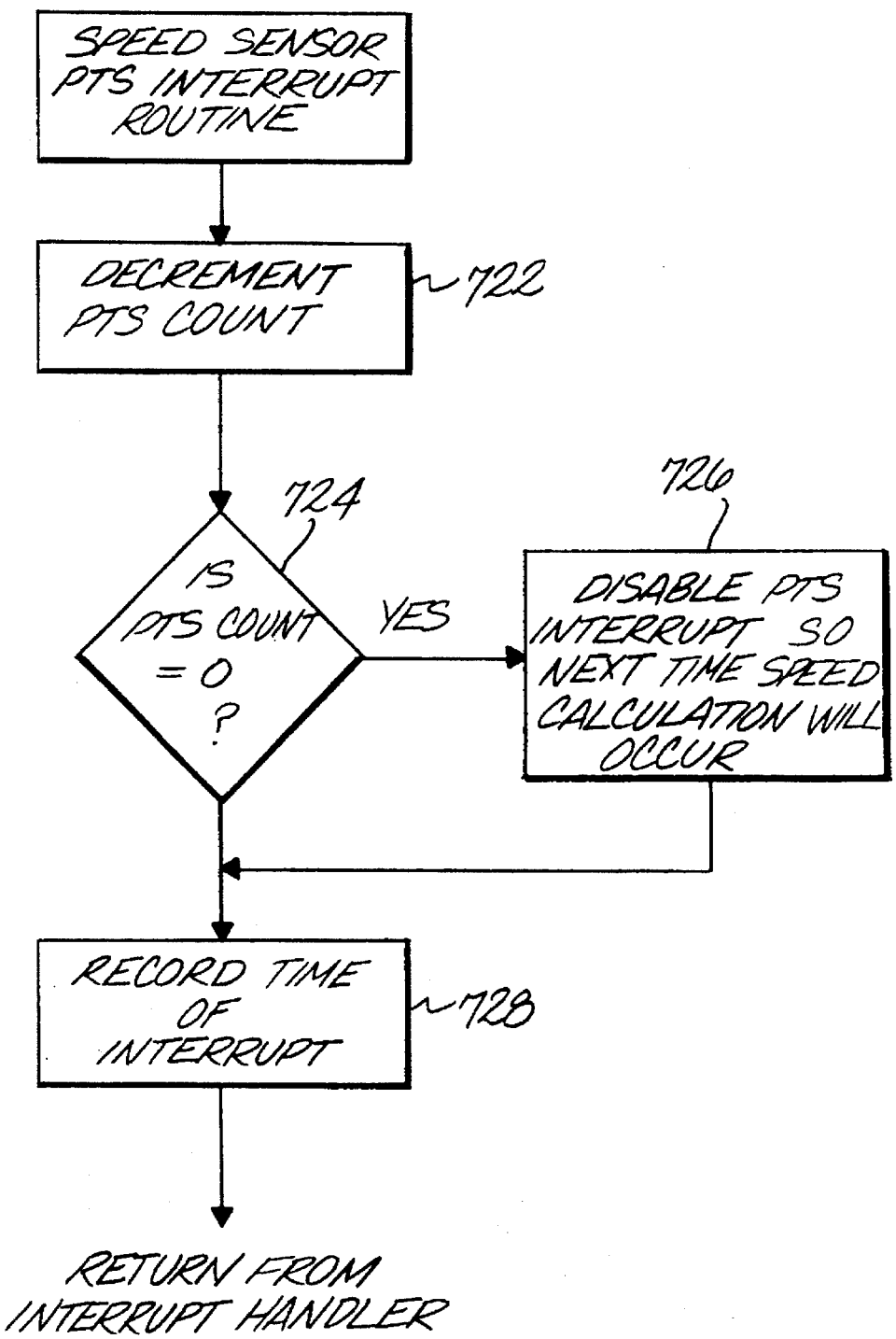

All other functions of the microcontroller are initiated through the interrupt processor on a timed or demand basis. Exemplary interrupt routines for the microcontroller are shown in FIG. 7. The software timer update interrupt routine occurs periodically as shown in FIG. 7a. Upon receiving this interrupt, the microcontroller determines if the speed sensor needs to be enabled in block 710. The speed sensor interrupt is disabled in various other interrupt routines as will be described subsequently. If the speed sensor interrupt has been disabled, the microcontroller enables the PTS speed sensor interrupt 712 and enables the speed calculation interrupt 714 to allow normal processing of speed information for update of the display on the instrument panel speedometer and odometers.

The microcontroller next conducts the Analog to Digital conversion of analog sensor data input in block 716. Results of the sensor inputs are stored in memory block 718 to update the VEHICLE SYSTEM STATUS menu for display upon demand as described with respect to FIG. 3. Updated information is output to the instrument panel displays by the microcontroller in block 720. The microcontroller then returns to the interrupt wait state.

Figure 7C:
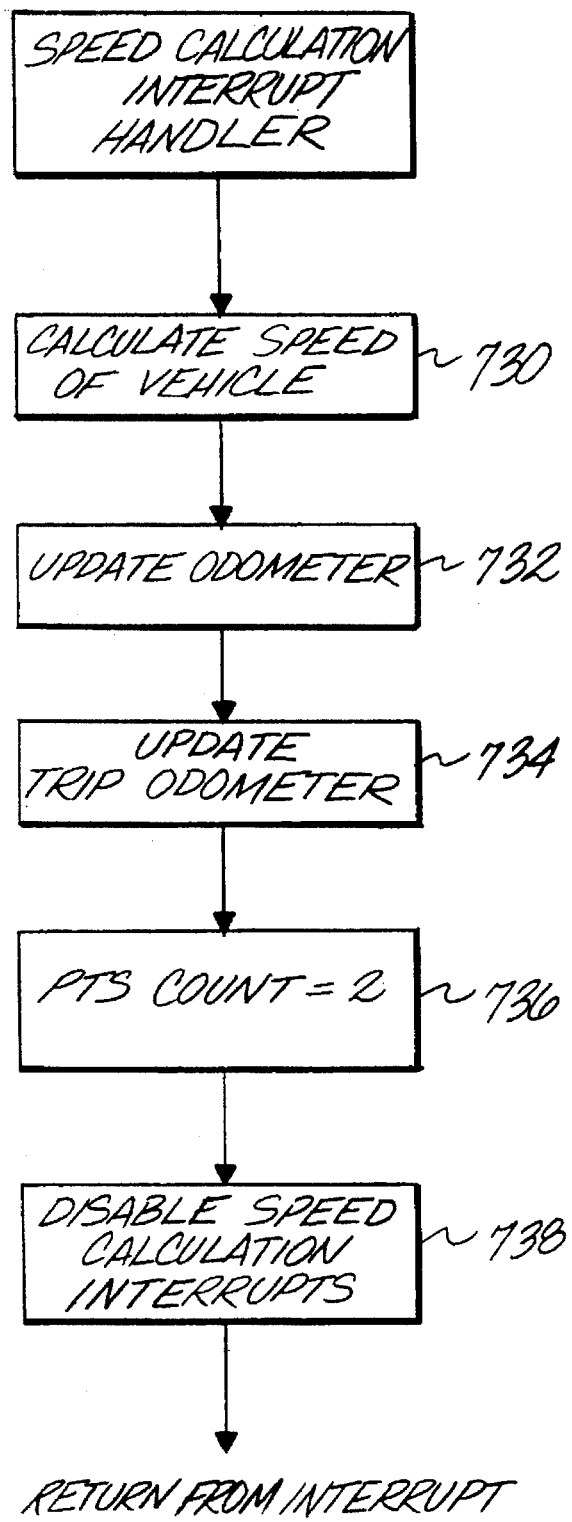
Figure 7D:
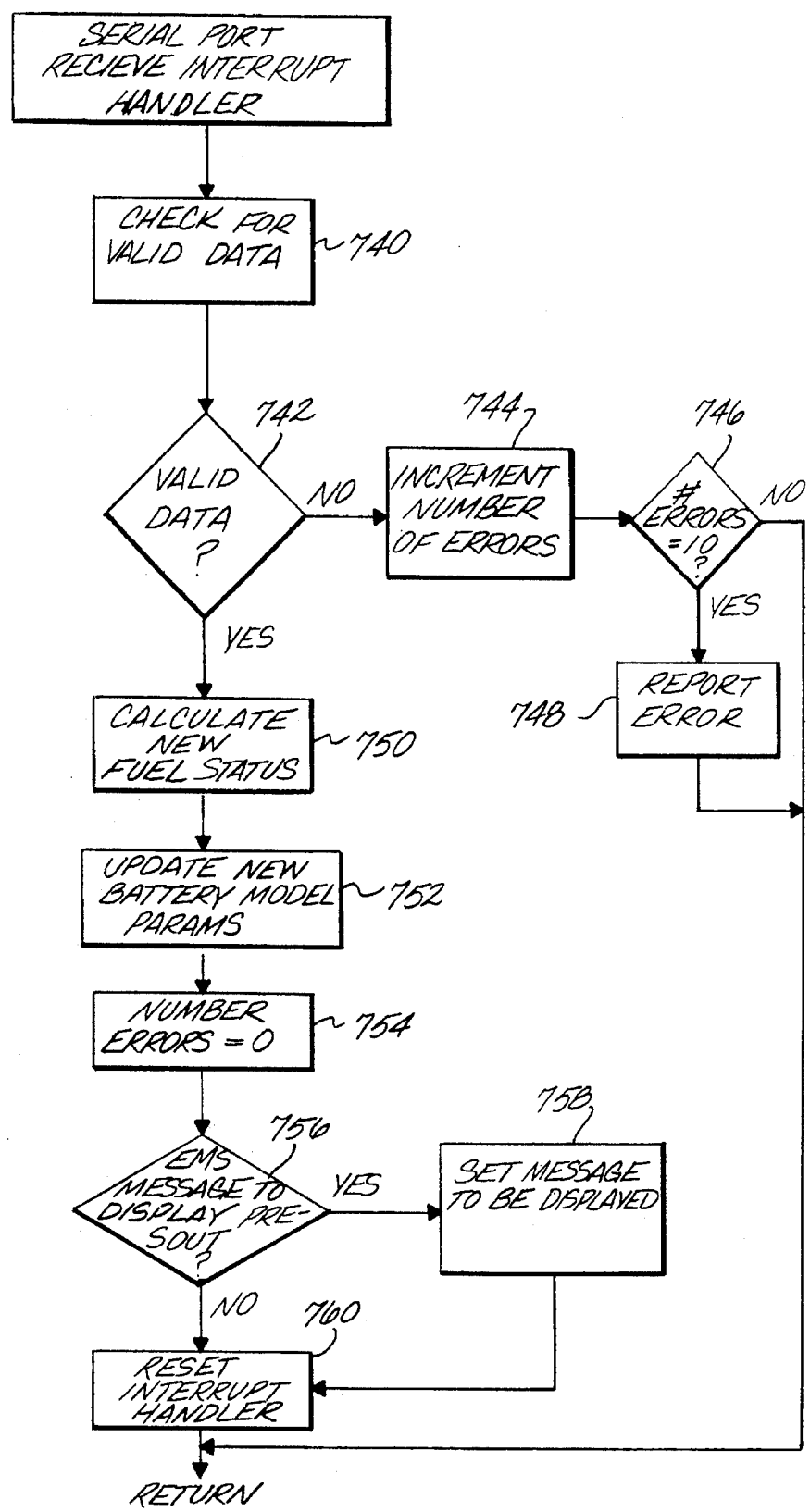

Calculation of vehicle speed and distance traveled for display on the speedometer and odometers of the instrument panel is accomplished employing interrupt routines for speed calculation and the speed sensor PTS interrupt as shown in FIGS. 7b and 7c. In the present embodiment, interrupt signals received from the IR detector of the speed sensor are accumulated and timed based on a predetermined PTS count. As shown in FIG. 7b, upon receiving an interrupt from the IR detector, the microcontroller decrements the PTS count 722 and determines if the PTS count is now 0 in block 724. If the PTS count is 0, the PTS interrupt is disabled 726 to allow a time speed calculation to occur in response to a speed calculation interrupt. The time of the PTS interrupt from the speed sensor is recorded 728 and stored for speed calculation. A return is then executed from the interrupt handler.

Speed calculation is accomplished upon receiving a speed calculation interrupt as shown in FIG. 7c. Speed calculation is accomplished by determination of the total elapsed time for the PTS count cycle of the speed sensor interrupts from the recorded time intervals in block 730. The total odometer and trip odometer are updated in block 732 and 734 respectively and the PTS count is reset in block 736 for initializing the speed sensor interrupt. The speed calculation interrupt is disabled 738 to preclude a speed calculation interrupt prior to initialization of the speed sensor PTS interrupts through the software timer update interrupt routine as previously described. A return from the interrupt handler is then executed.

Data from the battery monitor module is received on the serial port as previously described. Incoming data is accepted through a serial port receive interrupt as described in FIG. 7d. Data transmitted from the battery monitor module is provided in a predefined format for verification of valid data which is accomplished in block 740. If the data received is not valid as determined in block 742, a tabulation of the number of errors is incremented in block 744. If the number of errors detected is less than 10, as determined in block 746, the error is ignored and a return is executed from the interrupt handler. If the number of errors has reached 10, the microcontroller reports the error through the EMS text display as shown in block 748 to notify the driver of a battery monitor module failure.

If valid data is received from the battery monitor module, a new "fuel" status is calculated in block 750 to determine power remaining in the battery. Parameters for the battery model are then updated in block 752 for use in vehicle model calculations as previously described. The error monitor flag is then reset to 0 in block 754. A determination is made in block 756 if an updated message to the EMS display is required. For example, if the menu on the display is the vehicle on charge menu as previously described with respect to FIG. 3, a change in the battery status would be reflected on the menu. The microcontroller alters the display message as shown in block 758, if required, and the interrupt handler is reset in block 760 for return to the wait mode.

Figure 7E:
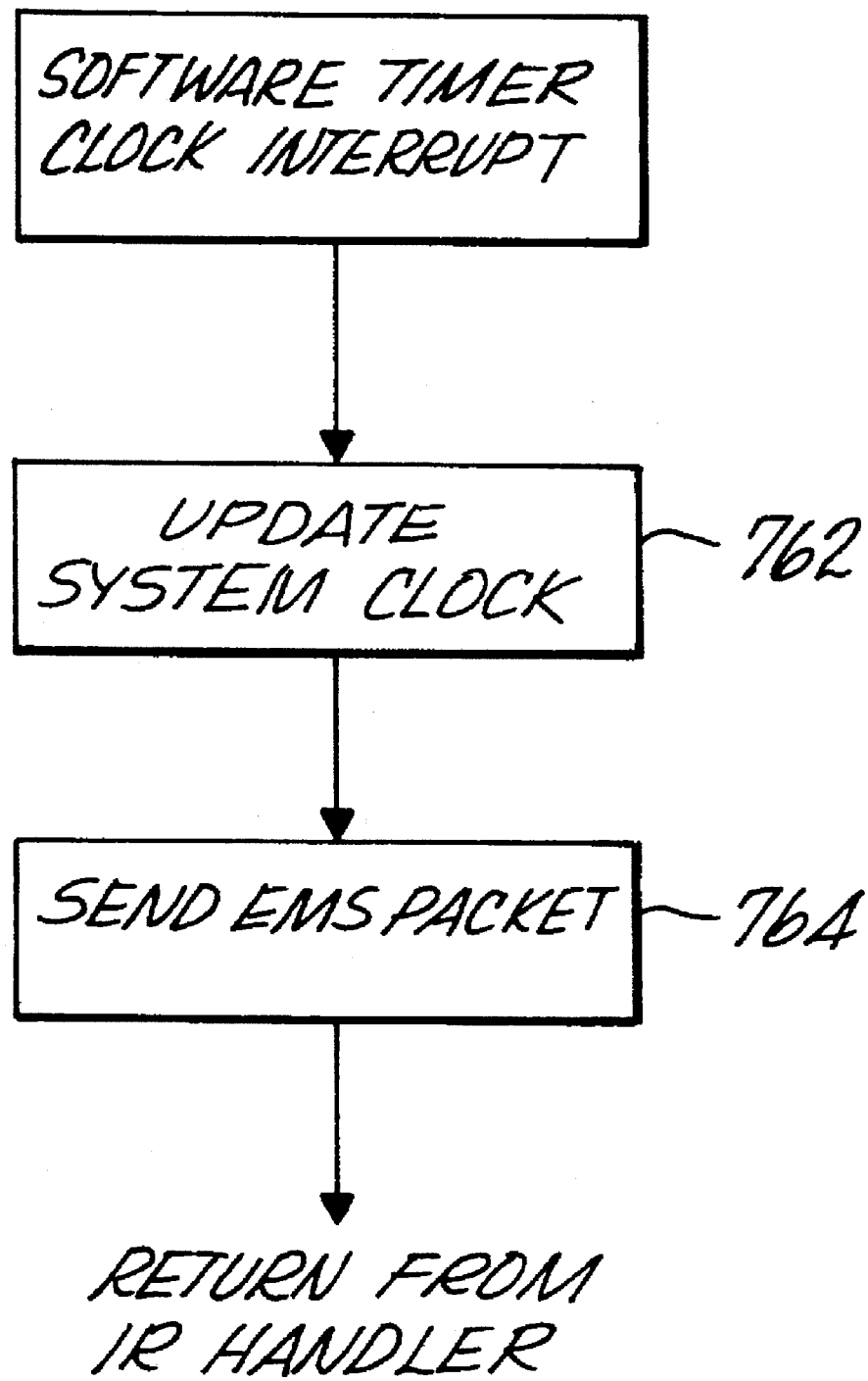

The software timer clock interrupt is accomplished as shown in FIG. 7e to accomplish updating of the system clock 762 and transfer of any battery management system data to the battery monitor module through the serial port. As previously described, the battery monitor module in the present embodiment is a self-contained unit, consequently, data is provided in a packet format executed by the microcontroller as shown in block 764. An example of data transmissions of this type would be associated with charging of the battery wherein control of the charging current and voltage by the battery monitor module is accomplished to charge the battery according to the desired charging algorithm as previously described.

Upon completion of the software timer clock interrupt, the microcontroller returns to the wait state from the interrupt handler.

The EMS in combination with a vehicle navigator system provides further expanded capability for efficient operation of the electric vehicle. Navigator systems, such as those disclosed in U.S. Pat. No. 4,926,336 to Yamada provide a database typically including street names, street segment x and y coordinates, street segment end addresses and assumed street segment speeds for a given mapped area. The basic purpose of a navigator is to provide an optimum route to be driven based on a starting point and a destination point. The present embodiment adds to the navigator database street segment grade and direction of grade, stop sign and traffic light locations and location of charging stations for electric vehicles. Associated with the traffic light data is a probability of a green light for each direction of traffic in the control intersection. Dynamic information on traffic congestion for given street segments is provided through a radio interface.

FIG. 8 provides a basic block diagram of the interface between the navigator and EMS. The navigator 810 is a self-contained system employing a database 812 having the characteristics previously described and a radio interface 814. The navigator incorporates a calculation engine 816 for determining routes between an entered beginning point and a desired destination point. A standard serial port interface 818 employing RS232 or other standard communication protocol connects the navigator to the EMS. A third serial port 88 as shown in FIG. 2 is employed by the microcontroller for communication with the navigation system.

In operation, the driver provides present position and destination information to the navigator system. The navigator selects several time efficient routes using normal processing models, as described in the prior art. These routes are likely to be the most energy efficient, however, iteration between the navigator and EMS is required for optimizing energy efficiency of the route. The data information for the route selected by the navigator is communicated to the EMS over the serial link. A protocol of the present embodiment provides for transmission of each street segment in following format: Send start of segment character (e.g., "S"); send length of segment (e.g., xx miles); send indication of stop at start of segment (e.g., "X"); send grade of segment (e.g., xx%); send direction of grade (e.g., "U" or "D" for up or down); send nominal speed of segment (e.g., xx miles/hour); and, send end of message character (e.g., "E"). The energy usage for the individual segment is calculated by the EMS employing the vehicle model and standard prediction algorithms previously described. For example, if the segment is an upward grade, with an average speed of 30 mph, the processing algorithm for the "uphill at xx mph" previously described with regard to the predict range menu is employed. A start or stop on the segment is accommodated by the EMS through a calculation scheme defining a predetermined acceleration or deceleration based on the nominal speed of the segment. For example, if the average speed of the segment is low, acceleration of 0.1 g is employed, while if average speed of the segment is high, an acceleration of 0.25 g is employed. Stopping at a constant deceleration of 0.5 g is employed.

The EMS will calculate the energy consumption as watt-hours for the entire trip defined by the navigator segment by segment. If the trip can be made on the energy available in the battery pack, the EMS reports the energy consumption for the trip. The navigator and EMS iterate with regard to the other candidate routes for optimizing the energy usage.

If the energy required for the trip will exceed the available battery energy, the EMS identifies to the navigator the street segment indicating where the vehicle will "run out" of energy. The navigator will then employ an alternate route scheme for identifying a destination with a charging station with a lower mileage requirement than the energy exhaustion point. Calculation of the route to the charging station with verification by iteration of the route with the EMS for energy consumption calculation is accomplished. Calculation of a route from the charging station to the original destination is then accomplished by the navigator. Calculation of this route requires input by the driver for the charging time to be employed at the charging station. Calculation of the energy level in the battery after the proposed charging is accomplished using the battery model as previously described.

Operation of the EMS in the "performance" mode allows elimination of iteration on the routes selected by the navigator and the most time efficient route selected by the navigator is employed for calculation of capability for the vehicle to accomplish the route on the given energy charge in the battery.

Figure 9A:
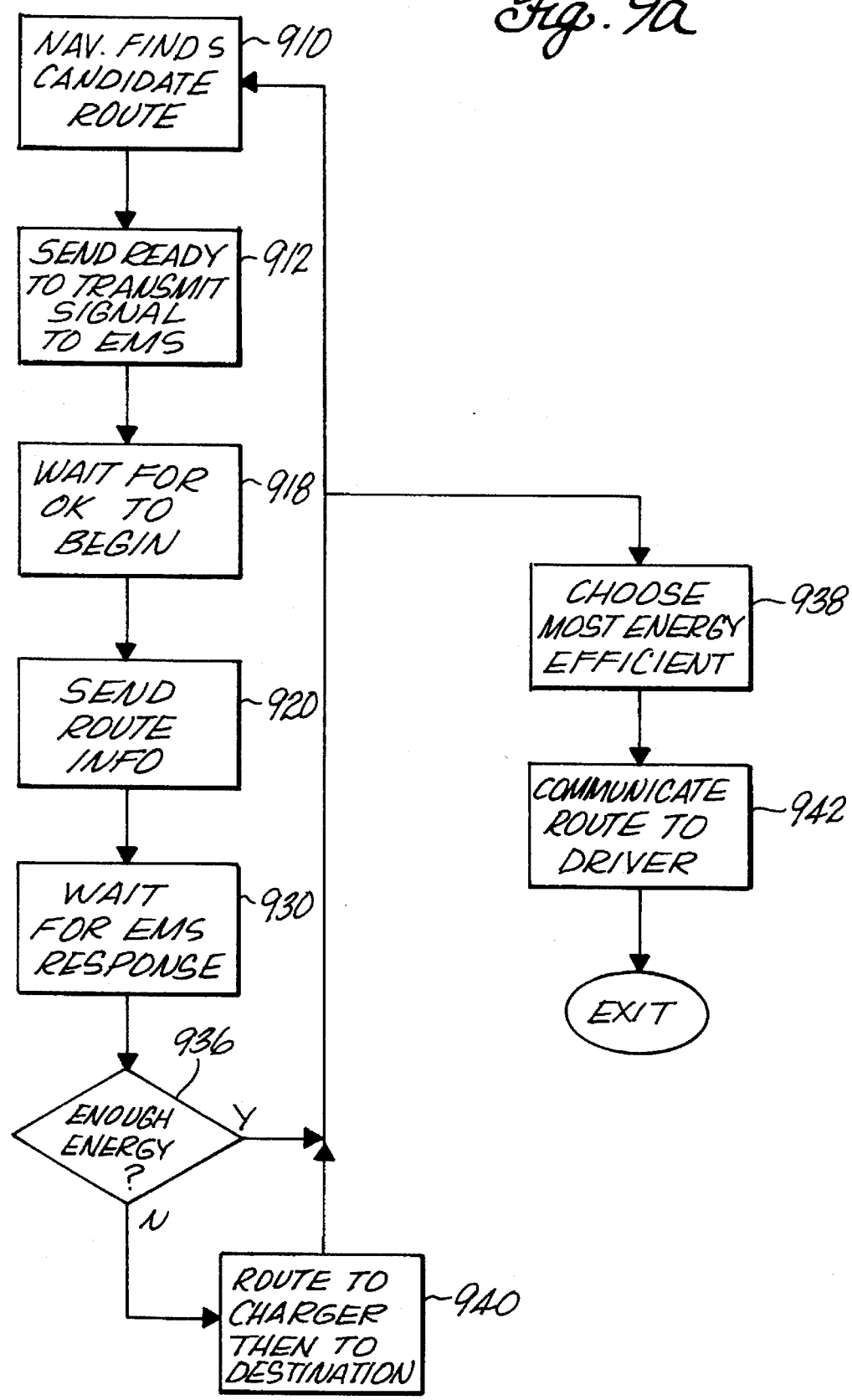
FIG. 9a is a flow diagram of the energy management system interface with the navigator.
Figure 96:
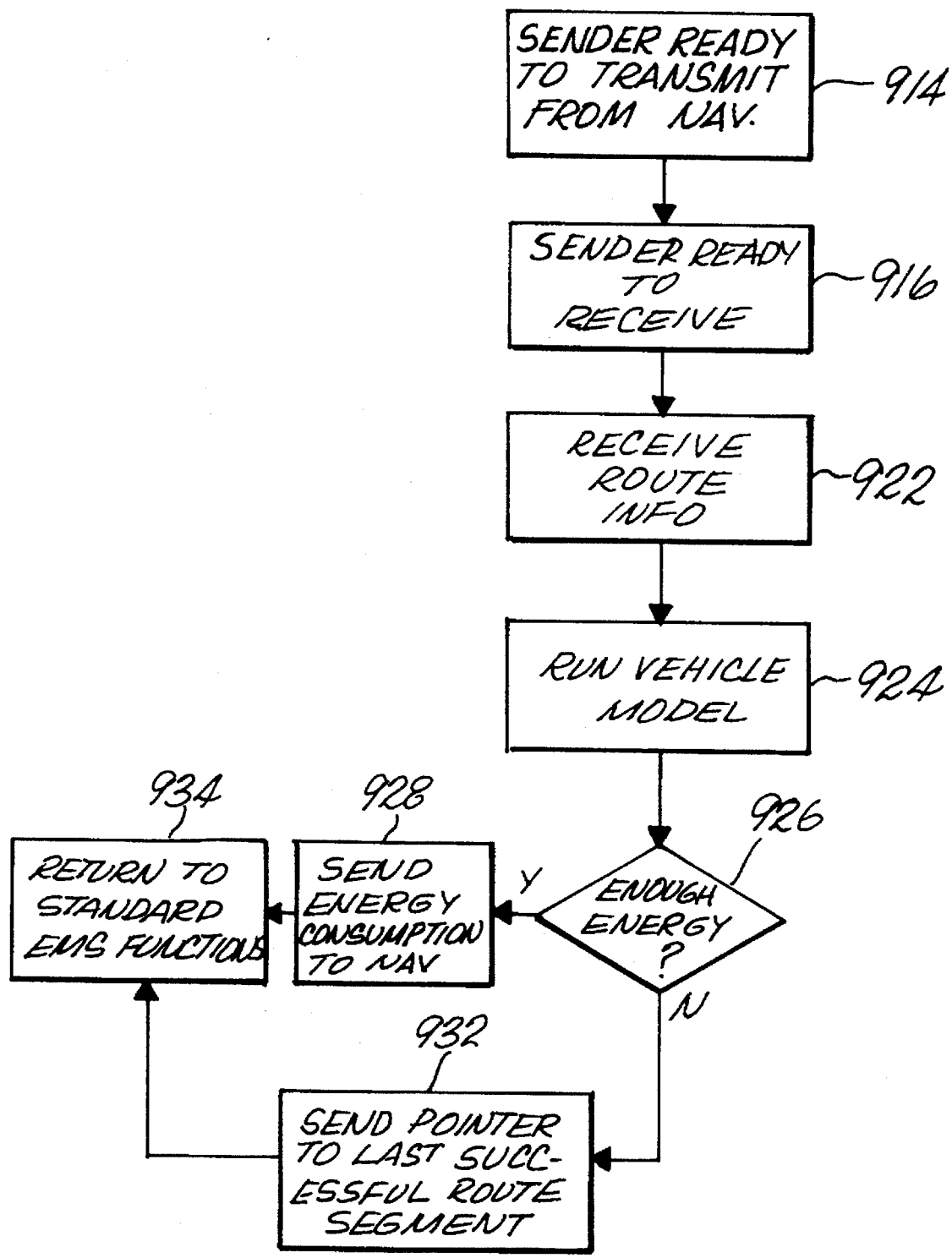

FIGS. 9a and 9b are flow diagrams describing the handshake operation between the EMS and navigator systems in the electric vehicle. As shown in FIG. 9a, upon entry by the driver of a present position and destination point, the navigator establishes a candidate route as shown in block 910. The navigator sends a ready-to-transmit signal to the EMS 912 which is received by the EMS in block 914 of FIG. 9b. The EMS responds by sending a ready-to-receive signal 916 which is received by the navigator in block 918 of FIG. 9a. The navigator proceeds to send route information 920 on a segment-by-segment basis to the EMS which receives the route information 922 and runs the vehicle model 924 to establish energy usage. The EMS determines if sufficient energy is remaining to complete the route proposed by the navigator. If sufficient energy remains an energy consumed value is provided to the navigator in block 928 which is received as a response by the navigator in block 930. If sufficient energy does not remain in the battery pack, the EMS provides a pointer to the last successful route segment 932 provided as the response to the navigator. Upon completion of the interaction between the EMS and the navigator, the EMS returns to standard EMS functions 934. The information concerning energy consumption or pointer for last successful route segment received by the navigator is analyzed in block 936. If sufficient energy is available for the route, additional candidate routes are evaluated and a selection of the most energy efficient route is made by the navigator software in block 938. If insufficient energy is available for any of the chosen routes, the navigator establishes a route to a charger station nearest the last successful route segment and employing the charger location as an initial position calculates routes to the desired destination based on driver input as to charging time in block 940. The final route is then communicated to the driver by the navigator in block 942.

TABLE 1

| Coded into the program: | |
| --- | --- |
| min speed = 20 | |
| max speed = 80 | |
| menu (1,0) = "LEVEL AT" | menu (2,0) = "ECONOMY" |
| (1,1) = "STOP AND GO" | (2,1) = "PERFORMANCE" |
| (1,2) = "UP HILL AT" | |
| (1,3) = "DOWN HILL AT" | |
| (1,4) = "UP AND DOWN AT" | |
| (1,5) = "MEMORIZE TRIP #" | |
| (1,6) = "NAVIGATOR PREDICTION" | |
| length (1) = 7 | |
| (3) = 1 | |
| Set by default or previous driver interaction: | |
| Speed = 30 | |
| Units = "MPH" | |
| Memorized trips = 3 | |

TABLE 2

Simplified FUDS (SFUDS) with velocity slightly changed
cycle time including rest, (s), TC= 360
rest time at end of cycle, (s), TREST = 0
s-by-s velocity, (km/h), for TC-TREST s

| | | | | |
|---|---|---|---|---|
| .000000E+00 | .000000E+00 | .000000E+00 | .000000E+00 | .000000E+00 |
| .000000E+00 | .000000E+00 | .000000E+00 | .000000E+00 | .000000E+00 |
| .000000E+00 | .000000E+00 | .000000E+00 | .000000E+00 | .000000E+00 |
| .000000E+00 | .240000E+01 | .480000E+01 | .720000E+01 | .970000E+01 |
| .111000E+02 | .122000E+02 | .134000E+02 | .146000E+02 | .158000E+02 |
| .169000E+02 | .179000E+02 | .187000E+02 | .195000E+02 | .201000E+02 |
| .208000E+02 | .214000E+02 | .220000E+02 | .227000E+02 | .233000E+02 |
| .240000E+02 | .245000E+02 | .249000E+02 | .256000E+02 | .261000E+02 |
| .275000E+02 | .290000E+02 | .303000E+02 | .315000E+02 | .328000E+02 |
| .340000E+02 | .351000E+02 | .360000E+02 | .370000E+02 | .379000E+02 |
| .388000E+02 | .396000E+02 | .378000E+02 | .359000E+02 | .341000E+02 |
| .320000E+02 | .301000E+02 | .277000E+02 | .253000E+02 | .227000E+02 |
| .171000E+02 | .114000E+02 | .580000E+01 | .200000E+00 | .000000E+00 |
| .000000E+00 | .000000E+00 | .000000E+00 | .000000E+00 | .000000E+00 |
| .000000E+00 | .000000E+00 | .000000E+00 | .000000E+00 | .000000E+00 |
| .000000E+00 | .240000E+01 | .480000E+01 | .720000E+01 | .970000E+01 |
| .111000E+02 | .122000E+02 | .134000E+02 | .146000E+02 | .158000E+02 |
| .169000E+02 | .179000E+02 | .187000E+02 | .195000E+02 | .201000E+02 |
| .208000E+02 | .214000E+02 | .220000E+02 | .227000E+02 | .233000E+02 |
| .240000E+02 | .245000E+02 | .249000E+02 | .256000E+02 | .261000E+02 |
| .275000E+02 | .290000E+02 | .303000E+02 | .315000E+02 | .328000E+02 |
| .340000E+02 | .351000E+02 | .360000E+02 | .370000E+02 | .378000E+02 |
| .388000E+02 | .396000E+02 | .378000E+02 | .359000E+02 | .341000E+02 |
| .320000E+02 | .301000E+02 | .277000E+02 | .253000E+02 | .227000E+02 |
| .171000E+02 | .114000E+02 | .580000E+01 | .200000E+00 | .000000E+00 |
| .000000E+00 | .000000E+00 | .000000E+00 | .000000E+00 | .000000E+00 |
| .000000E+00 | .000000E+00 | .000000E+00 | .000000E+00 | .000000E+00 |
| .000000E+00 | .240000E+01 | .480000E+01 | .720000E+01 | .970000E+01 |
| .111000E+02 | .122000E+02 | .134000E+02 | .146000E+02 | .158000E+02 |
| .169000E+02 | .179000E+02 | .187000E+02 | .195000E+02 | .201000E+02 |
| .208000E+02 | .214000E+02 | .220000E+02 | .227000E+02 | .233000E+02 |
| .240000E+02 | .245000E+02 | .249000E+02 | .256000E+02 | .261000E+02 |
| .275000E+02 | .290000E+02 | .303000E+02 | .315000E-02 | .328000E+02 |
| .340000E+02 | .351000E+02 | .360000E+02 | .370000E+02 | .378000E+02 |
| .388000E+02 | .396000E+02 | .378000E+02 | .359000E+02 | .341000E+02 |
| .320000E+02 | .301000E+02 | .277000E+02 | .253000E+02 | .227000E+02 |
| .171000E+02 | .114000E+02 | .580000E+01 | .200000E+00 | .000000E+00 |
| .000000E+00 | .000000E+00 | .000000E+00 | .000000E+00 | .000000E+00 |
| .000000E+00 | .240000E+01 | .480000E+01 | .726000E+01 | .970000E+01 |
| .111000E+02 | .122000E+02 | .134000E+02 | .146000E+02 | .158000E+02 |
| .169000E+02 | .179000E+02 | .187000E+02 | .195000E+02 | .201000E+02 |
| .208000E+02 | .214000E+02 | .220000E+02 | .227000E+02 | .233000E+02 |
| .240000E+02 | .245000E+02 | .249000E+02 | .256000E+02 | .261000E+02 |
| .266000E+02 | .270000E+02 | .274000E+02 | .278000E+02 | .283000E+02 |
| .288000E+02 | .293000E+02 | .296000E+02 | .301000E+02 | .304000E+02 |
| .309000E+02 | .312000E+02 | .362000E+02 | .407000E+02 | .447000E+02 |
| .483000E+02 | .513000E+02 | .543000E+02 | .571000E+02 | .597000E+02 |
| .621000E+02 | .644000E+02 | .666000E+02 | .681000E+02 | .695000E+02 |
| .708000E+02 | .721000E+02 | .732000E+02 | .744000E+02 | .755000E+02 |
| .766000E+02 | .777000E+02 | .787000E+02 | .797000E+02 | .806000E+02 |
| .814000E+02 | .824000E+02 | .832000E+02 | .840000E+02 | .848000E+02 |
| .855000E+02 | .863000E+02 | .869000E+02 | .875000E+02 | .861000E+02 |
| .847000E+02 | .832000E+02 | .818000E+02 | .803000E+02 | .789000E+02 |
| .774000E+02 | .760000E+02 | .745000E+02 | .731000E+02 | .718000E+02 |
| .703000E+02 | .689000E+02 | .676000E+02 | .663000E+02 | .649000E+02 |
| .650000E+02 | .653000E+02 | .655000E+02 | .657000E+02 | .660000E+02 |
| .661000E+02 | .663000E+02 | .665000E+02 | .668000E+02 | .669000E+02 |
| .671000E+02 | .673000E+02 | .674000E+02 | .676000E+02 | .678000E+02 |
| .679000E+02 | .681000E+02 | .682000E+02 | .684000E+02 | .686000E+02 |
| .687000E+02 | .689000E+02 | .689000E+02 | .690000E+02 | .692000E+02 |
| .694000E+02 | .695000E+02 | .695000E+02 | .697000E+02 | .698000E+02 |
| .698000E+02 | .700000E+02 | .687000E+02 | .673000E+02 | .660000E+02 |
| .645000E+02 | .632000E+02 | .618000E+02 | .604000E+02 | .591000E+02 |
| .576000E+02 | .562000E+02 | .547000E+02 | .533000E+02 | .518000E+02 |
| .502000E+02 | .488000E+02 | .472000E+02 | .457000E+02 | .441000E+02 |
| .423000E+02 | .406000E+02 | .388000E+02 | .370000E+02 | .352000E+02 |
| .333000E+02 | .312000E+02 | .291000E+02 | .267000E+02 | .243000E+02 |
| .216000E+02 | .182000E+02 | .142000E+02 | .930000E+01 | .450000E+01 |
| .000000E+00 | .000000E+00 | .000000E+00 | .000000E+00 | .000000E+00 |
| .000000E+00 | .000000E+00 | .000000E+00 | .000000E+00 | .000000E+00 |
| .000000E+00 | .000000E+00 | .000000E+00 | .000000E+00 | .000000E+00 |

Having now described the invention in detail as required by the patent statute, those skilled in the art will recognize modifications and substitutions to the embodiment disclosed herein. Such modifications and substitutions are within the scope and intent of the invention as defined in the following claims.

APPENDIX A

Power requirement at the battery terminals can be calculated from a specified velocity profile, provided that the vehicle characteristics (test weight, frontal area, draf coefficient, rolling resistance coefficients, the drivetrain efficiency, and the grade of the road) are given.

The instantaneous road-load power is calculated from the required force, which overcomes the drag force, the rolling resistance, and the grading effects while, at the same time, maintaining the vehicle at the specified speed. The equations for velocity, force, and power are given below.

The instantaneous speed of the vehicle at time t in any linear driving period can be expressed as:

$$V = V_1 + a\Delta t \quad \text{(A.1)}$$

where:
$a$ = acceleration or deceleration
$= (V_2 - V_1)/(t_2 - t_1)$;
$V_1$, $V_2$ = the speed at time $t_1$ and $t_2$ respectively;
$\Delta t = t - t_1$;
$t$ = time;
$t_1$ = the time at the beginning of the period; and
$t_2$ = the time at the end of the period.

The distance at time t is given by:

$$S = S_1 + v_1 \Delta t + \frac{a}{2}(\Delta t)^2 \quad \text{(A.2)}$$

where $S_1$ is the distance at $t_1$.

As shown in FIG. A.1, the total required driving force, $F_T$, is given by:

$$F_T = F_D + F_R + F_G + F_A \quad \text{(A.3)}$$

with the air-drag force, $$F_D = \frac{1}{2}\rho C_D A_F V^2 \quad \text{(A.4)}$$

the rolling resistance force, $$F_R = W_T \cos\theta(K_0 + K_1 V + K_2 V^2) \quad \text{(A.5)}$$

the force due to grade, $$F_G = W_T \sin\theta \quad \text{(A.6)}$$

and the acceleration force, $$F_A = \frac{W_T}{g} a \quad \text{(A.7)}$$

where:
$W_T$ = vehicle weight;
$g$ = gravitational acceleraton;
$\theta$ = grading angle, $\tan^1$ (% grade/100);
$K_0 K_1 K_2$ = rolling resistance coefficients;
$A_F$ = vehicle frontal area;
$\rho$ = air density; and
$C_D$ = drug coefficient The power at the wheels, $P_{wh}$, is given by:

$$P_{wh} = V F_T \quad \text{(A.8)}$$

and the power required at the battery terminals is:

$$P_\beta = \frac{P_{wh}}{\eta_D \eta_M} \quad \text{(A.9)}$$

where:
$\eta_D$ and $\eta_M$ are efficiencies of the transmission and the motor, respectively.

1. In the present embodiment, rather than using a constant, a function of rpm and torque is used. Thus $\eta_M = \eta_M$ (rpm,T) locating a table

| RPM | T | $T_1$ | $T_2$ | $T_3$ | $T_4$ ... |
|---|---|---|---|---|---|
| $R_1$ | | $\eta_{11}$ | $\eta_{12}$ ... | | |
| $R_2$ | | $\eta_{21}$ | | | |
| $R_3$ | | . | | | |
| $R_4$ | | . | | | |
| . | | . | | | |
| . | | | | | |
| . | | | | | | interpolation of this table is employed to get N (rpm, torque).

2. Also in the present embodiment, rather than using a constant, a function of rpm is used. Thus $\eta_D = \eta_D$ (rpm). We have a table

| RPM | $\eta_D$ |
|---|---|
| $R_1$ | $\eta_1$ |
| $R_2$ | $\eta_2$ |
| $R_3$ | $\eta_3$ |
| . | . |
| . | . |
| . | . | interpolation of this table is employed to get $\eta_D$ (rpm).

APPENDIX B
EXAMPLE 0F BATTERY DATA
TABLE D.1 Default Data Set for Sodium/Sulfure Batteries, 1988 Technology
Na/S battery - 1988 Technology: CSPL 24-cell module

| | |
|---|---|
| wt. of a battery cell, (kg), WC = | .120000E+00 |
| accessory wt./cell, (kg), WY = | .600000E−01 |
| no. of parallel strings, NPS = | .300000E+02 |
| cell amp-hours @ C/3, C3 = | .833000E+01 |
| cell cutoff voltage comp.1, DCOV1 = | .190000E+01 |
| cell cutoff voltage comp.2, DCOV2 = | .397500E+01 |
| no. of (DOD, NLV) data pairs = | 9 |
| .000 | 2.050 |
| .050 | 2.070 |
| .100 | 2.080 |
| .400 | 2.080 |
| .500 | 2.070 |
| .600 | 2.068 |
| .700 | 2.055 |
| .800 | 2.035 |
| 1.000 | 1.935 |
| no. of (DOD,R) data pairs = | 8 |
| .000 | .495E−01 |
| .050 | .383E−01 |
| .100 | .371E−01 |
| .200 | .371E−01 |
| .400 | .383E−01 |
| .600 | .404E−01 |
| .900 | .457E−01 |
| 1.000 | .468E−01 |
| Regen (DOD,NLV) data pairs = | 5 |
| .000 | 2.080 |
| .250 | 2.070 |
| .500 | 2.060 |
| .750 | 2.050 |

APPENDIX B
EXAMPLE OF BATTERY DATA
TABLE D.1 Default Data Set for Sodium/Sulfure Batteries,
1988 Technology
Na/S battery - 1988 Technology: CSPL 24-cell module

| | |
|---|---|
| 1.000 | 1.950 |
| Regen (DOD,R) data pairs = | 5 |
| .000 | .350E–01 |
| .250 | .370E–01 |
| .500 | .370E–01 |
| .750 | .380E–01 |
| 1.000 | .780E–01 |
| battery parameter, G1 = | .000000E–00 |

What is claimed is:

1. An energy management system, for vehicles employing a limited energy storage system, comprising:

means for receiving power status data from the energy storage system;

means for storing a plurality of predetermined driving profiles to model expected vehicle performance;

selection means for selection by the driver of one of said driving profiles;

calculation means connected to the receiving means and storage means for calculating range for the limited energy storage system based on the selected driving profile; and, output means to display the range calculation to the driver.

2. An energy management system as defined in claim 1 wherein the driving profiles include predetermined data for standard driving cycles.

3. An energy management system as defined in claim 1 further comprising means for storing energy storage system status data from the receiving means as a function of time and wherein the driving profiles include memorized energy storage system energy consumption data from previous vehicle trips stored by the energy storage system status data storage means.

4. An energy management system as defined in claim 1 wherein the limited energy storage system comprises a battery, further comprising controllable means for charging the battery and wherein the calculation means includes means for determining a battery charging profile based on the energy storage system status data and means for controlling the battery charging means to match the charging profile.

5. An energy management system as defined in claim 1 wherein the output means comprises a menu-driven display and the selection means comprises interactive selection keys for the menu.

6. An energy management system as defined in claim 1 wherein the limited energy storage system comprises multiple storage elements with differing rates of charge and discharge, further comprising means for controllably directing regenerated energy from braking of the vehicle to a selected one of the storage elements and wherein the calculation means includes means for controlling the directing means.

7. An energy management system as defined in claim 1 further comprising:

a plurality of vehicle subsystem sensors for determining subsystem status and a second plurality of environmental sensors for receiving data on parameters effecting energy consumption by the vehicle said subsystem sensors and environmental sensors connected to the calculation means and wherein the calculation means includes means for comparing inputs from said subsystem sensors and said environmental sensors for detection of predetermined inconsistencies between at least one of said environmental sensors and at least one of said vehicle subsystem sensors indicating inefficient energy consumption by a vehicle subsystem and means for displaying on the output means a message reflecting such detected inefficient energy consumption.

8. An energy management system as defined in claim 7 further comprising control means for disabling vehicle subsystems and wherein the calculation means further comprises means for activating the control means responsive to detected energy inefficiency.

9. An energy management system for vehicles having limited energy storage comprising:

a plurality of vehicle subsystem sensors for determining subsystem status and a second plurality of environmental sensors receiving data on parameters affecting energy consumption by the vehicle;

a calculation means for comparing inputs from said subsystem sensors and said environmental sensors for detection of a predetermined inconsistency between one of said subsystem sensors and one of said environmental sensors indicating inefficient energy consumption by a vehicle subsystem; and means for providing a signal output responsive to detection of inefficient energy consumption.

10. An energy management system as defined in claim 9 wherein the signal output providing means is interactive with a driver of the vehicle and comprises a display means connected to the calculation means for display of information concerning said inefficient energy consumption and recommendations to rectify the inefficient energy consumption.

11. An energy management system as defined in claim 9 wherein the signal output providing means comprises means for directly controlling vehicle subsystems, said controlling means responsive to said calculation means.

12. An energy management system, for vehicles employing a limited energy storage system, comprises:

means for receiving power status data from the energy storage system;

means for storing a plurality of predetermined driving profiles including data supplied by a vehicle navigator for route segments between a present position and a desired destination;

selection means for selection by the driver of one of said driving profiles;

calculation means connected to the receiving means and storage means for calculating range for the limited energy storage system based on the selected driving profile; and output means to display the range calculation to the driver.

* * * * *

UNITED STATES PATENT AND TRADEMARK OFFICE
CERTIFICATE OF CORRECTION

PATENT NO. : 5,487,002
DATED : January 23, 1996
INVENTOR(S) : Robert W. Diller; Jeffrey W. Pavlat It is certified that error appears in the above-indentified patent and that said Letters Patent is hereby corrected as shown below:

```
Column 3, line 42, after "variety of" insert -- subsystem
          and environmental --.
Column 3, lines 43,44, after "voltage" delete "subsystem
          and environment".
Column 5, line 10, change "FIG." to -- FIGS. --.
Column 6, line 11, before "initial" change "and"
          to -- an --.
Column 9, line 2, after "either" change "a" to -- an --.
Column 12, line 38, after "off" delete "of".
Column 13, line 12, change "if" to -- If --.
Columns 17,18, line 15, TABLE 2, fourth column, change
          370000 E+02" to -- .378000E+02 --.
Columns 17,18, line 38, TABLE 2, fourth column, change
          ".315000E-02" to -- .315000E+02 --.
Columns 17,18, line 45, TABLE 2, third column, change
          ".726000E+01" to -- .720000E+01 --.
Column 19, line 11, change "draf coefficient" to -- drag
          coefficient --.
Column 19, line 66, change "drug coefficient" to -- drag
          coefficient --.
```

Signed and Sealed this

Twenty-fourth Day of September, 1996

Attest:

BRUCE LEHMAN

*Attesting Officer*     *Commissioner of Patents and Trademarks*